(12) United States Patent
Wiest et al.

(10) Patent No.: US 10,962,432 B2
(45) Date of Patent: Mar. 30, 2021

(54) SYSTEMS AND METHODS FOR PRESSURE MEASUREMENT

(71) Applicant: The United States of America, as represented by the Secretary of the Navy, Crane, IN (US)

(72) Inventors: Aaron Wiest, Norco, CA (US); Dylan R. Switzer, Riverside, CA (US); Craig MacDougall, Norco, CA (US); Llewelynn R. Galace, Foothill Ranch, CA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 16/100,165

(22) Filed: Aug. 9, 2018

(65) Prior Publication Data

US 2020/0284678 A1 Sep. 10, 2020

(51) Int. Cl.
*G01L 9/00* (2006.01)
*G01L 13/04* (2006.01)
*G09B 23/12* (2006.01)

(52) U.S. Cl.
CPC ............ *G01L 9/0088* (2013.01); *G01L 13/04* (2013.01); *G09B 23/12* (2013.01)

(58) Field of Classification Search
CPC ..... G01L 19/147; G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672;
(Continued)

(56) References Cited

U.S. PATENT DOCUMENTS 2,525,232 A * 10/1950 McGaughy ............ A63H 23/08
472/67
2,701,966 A 2/1955 Brown
(Continued)

OTHER PUBLICATIONS

Christian B Anfinsen; C. Lloyd Claff; "An Extension of the Cartesian Diver Micro Respirometer Technique" Sep. 20, 1946; p. 27-33.

*Primary Examiner* — Andre J Allen
(74) *Attorney, Agent, or Firm* — Naval Surface Warfare Center, Crane Division; Christopher A. Monsey

(57) ABSTRACT

Apparatus, systems, and methods of measuring relative pressure based on the displacement of a Cartesian diver are provided. Within the system, various designs of divers, as well as a variety of measurement methods implementing such systems and apparatus, are illustrated. The systems and methods described herein are directed to precise pressure measurements traceable to the SI through the vertical displacement of a ludion within a two fluid system. The system is selectively optimized to ensure the buoyancy and mass of the ludion as well as the density of the gases and fluids involved are known and controlled.

24 Claims, 22 Drawing Sheets

(58) Field of Classification Search
CPC ... G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16

USPC .................................................. 73/700–756

See application file for complete search history.

(56) References Cited

U.S. PATENT DOCUMENTS

| | | | |
|---|---|---|---|
| 3,209,569 A | 10/1965 | Milford | |
| 3,878,624 A | 4/1975 | DeFelice | |
| 4,886,459 A * | 12/1989 | Fuller | G09B 23/12 434/300 |
| 5,152,179 A * | 10/1992 | Charrier | G01L 7/22 374/143 |
| 7,112,111 B1 * | 9/2006 | King | B63B 1/00 114/331 |
| 7,347,089 B1 * | 3/2008 | Kelley | G01F 17/00 73/149 |
| 10,640,188 B1 * | 5/2020 | Kaeli | B63G 8/24 |

* cited by examiner

Graph 1. Change of Bubble Volume

Graph 2. Y Displacement

| Initial Bubble Volume (cm^3) | 12 | 13 | 14 | 15 | 16 |
|---|---|---|---|---|---|
| Psi Range, Initial is 14.7 | 2 | 3 | 4 | 6 | 7 |
| Y Range (cm) | 11.82-13.13 | 10.09-13.89 | 8.37-13.53 | 6.65-14.14 | 4.93-13.82 |

$R = .958$ cm $L = 14.279$ cm $l = 13.463$ cm $m = 10.1$ g

SYSTEMS AND METHODS FOR PRESSURE MEASUREMENT

FIELD OF THE INVENTION

The present invention generally deals with measuring the relative pressure and the associated apparatus and methods involved in determining such. Additionally, the present invention generally deals with the establishment of pressure measurement standards and more accurate methods of determining such standards.

BACKGROUND

A Cartesian Diver, or ludion, is a device commonly seen in classroom demonstrations about density and/or buoyancy in which a hollow vessel is partially filled with water and air such that the vessel will float within a container filled with water. The container is subsequently sealed or closed and pressure is applied to the container. As pressure is applied, the ludion will sink towards the bottom of the container demonstrating various principles including buoyancy (Archimedes' principle) and Pascal's law.

SUMMARY OF THE INVENTION

Many embodiments are directed to pressure measuring apparatus including:
- a container having one or more sealable ends defining an internal volume configured to receive at least a first and a second fluid such that the first fluid has a density less than the density of the second fluid wherein a first portion of the internal volume is filled with the first and second fluids such that the first and second fluids are separated by a boundary interface and wherein a second portion of the internal volume is filled with a first compressible gas disposed above the first fluid;
- a vessel having at least one non-sealable opening and at least one sealable portion defining an internal cavity, the vessel being disposed in a downward direction within the internal volume of the container such that the at least one non-sealable opening is disposed in a downward direction and configured to receive at least a portion of the second fluid such that a first portion of the internal cavity is filled with the second fluid and a second portion is filled with a second compressible gas such that the vessel is buoyantly positioned between the first and second fluids, and the boundary interface intersects the vessel at a first pressure, and wherein a change in the environmental pressure of the first compressible gas is communicated to the first and second fluids and the second compressible gas such that as the environmental pressure changes the volume of the second compressible gas changes causing vertical movement of the vessel within the two fluids;
- a precision measurement device configured to measure the movement of the vessel within the two fluids; and
- a measurement translation device in communication with the precision measurement device and configured to receive a movement input data from the measurement device and translate the movement input data to a physical parameter.

In other embodiments, the physical parameter is selected from at least one of the following: a pressure change in the environment, a pressure change in the environment of the container, and the dissolution of a gas into one or more of the fluids.

In still other embodiments, the apparatus further includes a pressure inducing element configured to induce a pressure change to the container to be communicated to the first compressible gas.

In yet other embodiments, the vessel is configured to have a center of gravity below a center of buoyancy of the vessel system, the center of buoyancy comprising at least the vessel, the second incompressible gas, and the first and the second fluids over the operating range of the system.

In still yet other embodiments, the measuring device is an interferometer.

In still yet other embodiments, the measuring device is a force transducer, and wherein the vessel further comprises a tether connected between the vessel and the force transducer such that movement of the vessel is communicated to the measuring device.

In still yet other embodiments, the first and second compressible gases are capable of maintaining a constant number of molecules during apparatus operation.

In still yet other embodiments, the first and second compressible gases have a low solubility constant over the operating range of the system.

In still yet other embodiments, the second compressible gas is helium.

In still yet other embodiments, the apparatus further includes a first and a second electrical probe, wherein the first electrical probe is positioned in the first fluid, and wherein the second electrical probe is disposed within the second fluid such that when the vessel changes position within the first and second fluids, the change in position will generate a change in current correlated to the change in pressure.

In still yet other embodiments, the apparatus further includes a reflective component configured to receive a portion of the reflected light generated by the interferometer.

In still yet other embodiments, the reflective component is disposed within the vessel at a crown line between one of either the second compressible gas and the second fluid, or the between the first and second fluids.

In still yet other embodiments, the reflective component is disposed on an external surface of the vessel.

In still yet other embodiments, the reflective component is disposed on an internal surface of the vessel.

In still yet other embodiments, the vessel comprises a generally cylindrical configuration.

In still yet other embodiments, the vessel is configured to have a first outer dimension, a second outer dimension, and an inner dimension such that the first outer dimension is greater than the second outer dimension and wherein a portion of the vessel is configured with the first outer dimension and another portion is configured with the second outer dimension and wherein the inner dimension remains constant.

In still yet other embodiments, the vessel comprises a second inner dimension configured to be larger than the inner dimension and wherein the portion of the vessel configured with the first outer dimension correlates with the second inner dimension.

In still yet other embodiments, the apparatus further includes a temperature regulation device in thermal communication with the first container and configured to regulate the temperature of the first and second fluids and the first and second compressible gases.

In still yet other embodiments, the temperature regulation device comprises an ice water slurry.

In still yet other embodiments, the first fluid is selected from a group of non-polar liquids selected from the group of mineral oil, decamethyltetrasiloxane, and vacuum pump oil.

In still yet other embodiments, the second fluid is selected from a group of polar liquids selected from the group of ethylene glycol, propylene glycol, and water.

In still yet other embodiments, the measuring device is configured to measure changes in position of the vessel to 1 nm of displacement uncertainty.

In still yet other embodiments, the container has an auxiliary arm defining a second internal volume wherein the second internal volume is connected to the internal volume of the container such that the first fluid may flow between the container and the auxiliary arm.

Many other embodiments are directed to methods for measuring pressure including:
- providing a container having one or more sealable ends defining an internal volume;
- disposing at least a first and a second fluid within the internal volume, wherein the first fluid has a density less than the density of the second fluid, such that a first portion of the cavity is filled with the first and second fluids, such that the first and second fluids are separated by a boundary interface, and wherein a second portion of the cavity is filled with a first compressible gas disposed above the first fluid;
- placing a vessel having at least one non-sealable opening and at least one sealable portion defining an internal cavity within the first container in a configuration such that the at least one non-sealable opening is disposed in a downward direction;
- filling a portion of the vessel with a second compressible gas such that the vessel is buoyantly positioned between the first and second fluids such that the boundary line intersects the vessel at a first pressure;
- inducing a change in pressure on the first compressible gas such that the pressure exerted on the first fluid is changed and said pressure change is translated to the second compressible gas through the second fluid thereby changing the volume of space within the portion of the vessel occupied by the second compressible gas, such that the vessel changes position within the first and second fluids relative to the boundary interface;
- measuring the movement of the vessel within the first and second fluids disposed within the internal volume; and
- translating the measured movement from the measuring device to a pressure change.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as various embodiments of the disclosure and should not be construed as a complete recitation of the scope of the disclosure, wherein.

DETAILED DESCRIPTION

Figure 1:
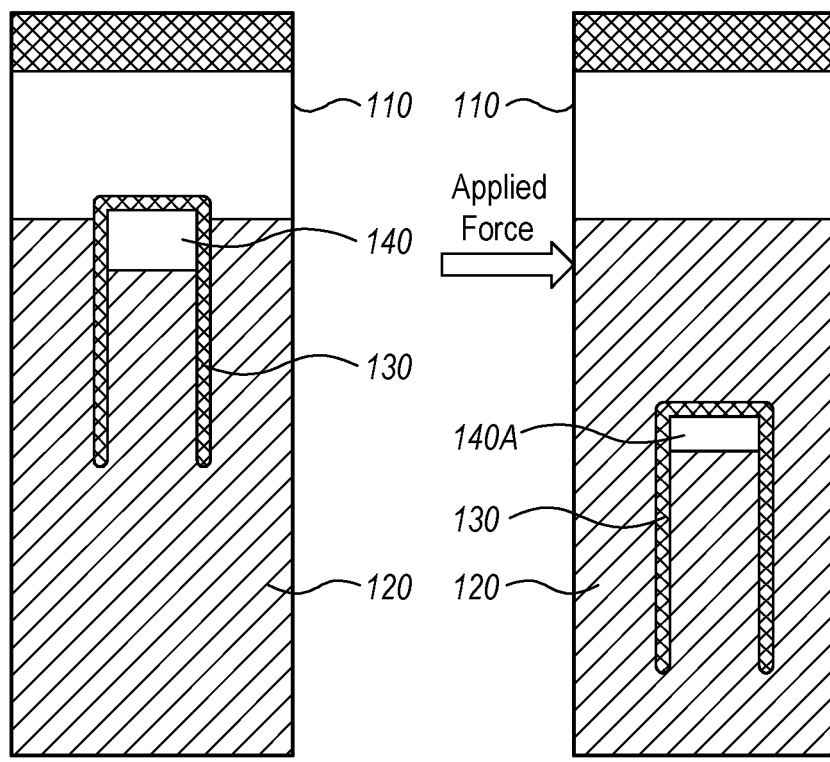
FIG. 1 illustrates a typical Cartesian diver system as known in the art.

The present disclosure may be understood by reference to the following detailed description, taken in conjunction with the drawings as described below. It is noted that, for purposes of illustrative clarity, certain elements in various drawings may not be drawn to scale.

In accordance with the provided disclosure and drawings, the apparatus, systems, and methods of measuring relative pressure based on the displacement of a Cartesian diver are provided. Within the system, various designs of divers, as well as a variety of measurement methods implementing such systems and apparatus, are illustrated.

Traditional methods of measuring relative pressure typically use devices similar to the traditional barometer. The barometer measures changes in atmospheric pressure through a variety of means. One method that has been used has been a water based barometer. Water based barometers comprise an apparatus as simple as a curved U-shaped tube with one sealed end and one open end. Within the sealed portion, there is a determined amount of gas that acts on the fluid by applying pressure to the surface of the fluid. When the pressure of the gas is equal to atmospheric pressure, the level of the fluid between the two sides of the U-shaped tube is equal, and as the atmospheric pressure changes, the levels of each side of the tube also change, thus indicating a change in relative pressure.

Various other methods and devices have also been used or disclosed that are capable of measuring pressure. However, a key component of an apparatus used in measuring pressure such as the one in this patent is ensuring that it is traceable to the SI (International System of Units). There are seven base measurement quantities within the SI: mass, temperature, length, time, current, luminous intensity, and amount of substance. Pressure is a derived quantity comprised of mass, time, and length. Consequently, the apparatus would achieve measurement traceability to the SI through mass, length, and time calibrations.

Measurement standards maintained at NIST represent the nation's highest level of measurement capability and provide a necessary linkage between working level measurements utilized in industry, government, and elsewhere, and the realization of the international base measurement quantities maintained at the Bureau International des Poids et Mesures (BIPM). In 2001, Douglas A. Olson illustrated the potential need to reevaluate standards for piston gage pressure. (See, e.g., "*Capabilities and Uncertainties of the Piston Gage Pressure Standard at NIST*", Douglas A. Olson, Nov. 30, 2001.) Olson illustrated that uncertainties exist in pressure measurements of gas and oil standards ranging from 13 ppm to 40 ppm and 18 ppm to 49 ppm, respectively. Established NIST standards have demonstrated uncertainties of 5.2 ppm. (See, e.g., https://www.nist.gov/calibrations/low-pressure-vacuum-and-leak-measurements-calibrations, under "Low-Pressure Calibrations (30010C-30025S and 30040S)".) In accordance with many embodiments, the apparatus and methods described herein may produce uncertainties approaching those reported by NIST while at the same time providing greater access to the measurement community for access to precision pressure measurement capability.

Embodiments of the instant disclosure are directed to methods and systems for measuring pressure capable of traceability to the SI. Embodiments illustrate an apparatus for precision pressure measurement in strictly controlled environments that are traceable to the SI. Furthermore, the present invention is directed to systems and methods capable of producing a finer resolution of measurement for pressure than traditional pressure measurement systems.

Cartesian Diver System

The Cartesian diver, or ludion, is an apparatus that has been used as a demonstration in physics to illustrate the effects of and principles of pressure and buoyancy. The ludion is a vessel shaped in such a way to hold a gas bubble, such as air, while partially submersed in a fluid. It is placed inside a closable/deformable container, such as a screw-top plastic bottle, and the bottle is mostly filled with a fluid, such as water. The ludion system (ludion$_{sys}$), which includes the vessel and gas bubble and fluid, are typically configured such that the ludion floats just at the surface of the fluid in the closable container when the closable container is in a state of equilibrium. The container is exposed to atmospheric pressure naturally existing on the container, and the gas trapped inside the ludion keeps the ludion.

When an external pressure or force is applied to the sides of the closable container, such as squeezing the container, the internal pressure on the fluid is also increased. The increase in pressure on the fluid forces more fluid into the ludion, thereby increasing the pressure on and compressing the bubble. A smaller bubble and an increased amount of fluid in the ludion increases the mass of the ludion$_{sys}$ causing the ludion to sink. (In other words, the buoyancy of the ludion$_{sys}$ is dependent on the bubble volume, as well as the density of the ludion material and the mass of the ludion$_{sys}$.) As the ludion sinks, fluid above the ludion increases, thereby adding to the pressure exerted on ludion and the bubble (hydrostatic pressure). (This is the same principle as when a diver dives in the ocean and the deeper the diver goes the more pressure exists on the diver.) Once the diver drops below the surface of the fluid, the increasing hydrostatic pressure will cause it to drop to the bottom of the container. When the pressure is released, the bubble will return to its original state (in this case, it will expand) forcing fluid out of the ludion, and the ludion will rise to its original position.

FIG. 1 illustrates a traditional Cartesian diver system as known in the art. As shown, a traditional system comprises a container 110 filled with at least one fluid 120. A separate partially sealed vessel 130 is illustrated as being partially filled with fluid leaving a small chamber or pocket of gas 140 at the top of the cavity portion of the vessel 130. During operation, the ludion 130 is placed inside the container 110 in an inverted configuration such that the opening to the ludion is directed downward and a pocket of gas is disposed within the inverted ludion cavity. The mass of ludion$_{sys}$, which includes the mass of the ludion and the gas and fluid disposed within the ludion, is configured such that, at atmospheric pressure (the easiest pressure to conduct the demonstration at), the ludion floats at the top of the fluid 120 in the container 110. As an applied pressure is exerted on the system, fluid is forced into the cavity 135 of the ludion 130 and the gas inside the ludion compresses resulting in a smaller volume of gas 140A. The increased fluid inside the ludion cavity also causes the mass of the ludion$_{sys}$ to increase. A reduced volume of gas and increased mass of the ludion$_{sys}$ alters the buoyancy such that the ludion sinks towards the bottom of the container. It will be understood that this state is reversible such that a reduction in pressure would similarly result in a reduction in the amount of fluid in the ludion cavity and an expansion in the pocket of gas.

Embodiments of Pressure Measurement Systems

Although traditional Cartesian diver systems provide a gross demonstration of the effect of pressure change on the gas bubble volume and resulting buoyancy of the ludion, the systems cannot provide measurements of pressure in accordance with required standards, since the single fluid design does not allow the diver to reach an equilibrium position at any fixed and truly stationary position within the fluid. In addition, conventional systems have crude designs that do not allow for pressure measurement across wide pressure ranges and are not configured to account for environmental effects on the system, such as temperature, humidity, etc. In particular, environmental effects can impact the properties of each of the individual components of the system including the fluid(s) and gas(es) used within the system. Embodiments of the invention presented herein provide systems and methods capable of being finely tuned to measure relative pressure with extreme accuracy.

Figure 2:
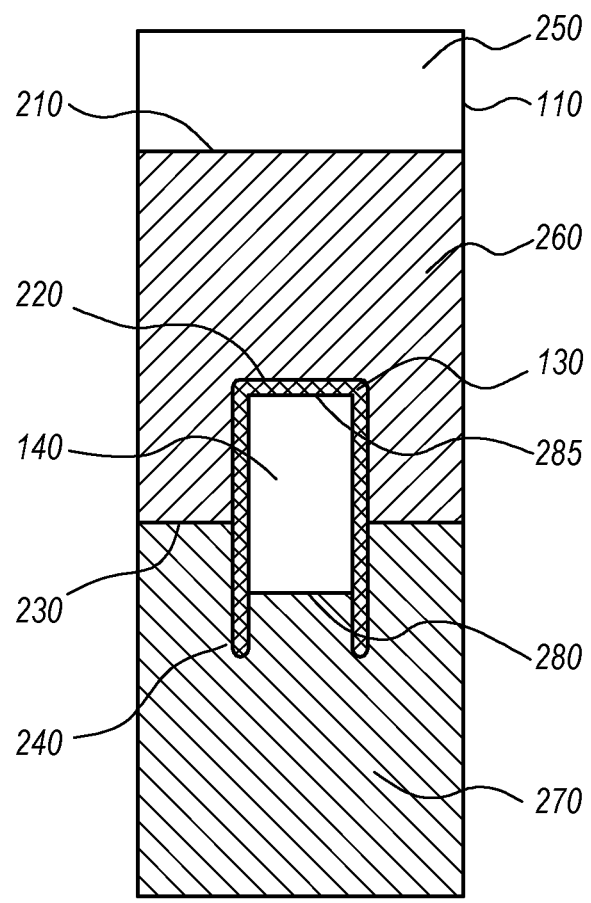
FIG. 2 illustrates a two fluid Cartesian Diver system in accordance with embodiments of the invention.

More particularly, embodiments of systems and methods as described herein are configured to precisely measure variations in system pressure based on the changes in ludion position within the overall system. As shown in FIG. 2, embodiments of such two fluid systems generally comprise two immiscible fluids 260/270 disposed within a sealed or sealable container 110 and having a pressure head 250 of gas disposed above the two immiscible fluids. Although any combination of immiscible fluids may be used in accordance with specific implementations, the two fluids must have different densities such that the fluids separate and form a boundary interface layer 230 therebetween. As shown in FIG. 2, the first fluid 260 has a lower density than the second fluid 270 and thus floats on top of the second fluid 270 forming a boundary interface layer 230; referred to as the vinculum herein.

Accordingly, in many embodiments in which a two fluid system is used, the ludion would be at equilibrium at some position between the two fluids such that at least a portion of the ludion crosses the vinculum. The position of the ludion is dependent on the gas bubble volume 140 in the ludion cavity 285 (as shown in FIG. 2), the densities of the ludion material and two fluids, and the mass of the ludion$_{sys}$, and is affected by hydrostatic pressure. Hydrostatic pressure is equal to the applied pressure (above liquid 260) or atmospheric pressure (if the system is open) plus the pressure of the first fluid (lower density fluid) 280 exerted on the bubble inside the ludion. In other words, the pressure on the bubble at equilibrium is determined by the atmospheric pressure plus the pressure of the first fluid (or where the crown is below the vinculum, then the hydrostatic pressure also has a component from lower liquid 270), which is equal to the density multiplied by the volume of the first fluid.

According to embodiments, this equilibrium state is very sensitive to changes in pressure at pressure head 250. Specifically, according to many embodiments, as the pressure at the pressure head of the two fluid system changes, the force being exerted on the fluids in the system in turn causes fluid to flow into or out of the ludion cavity. The changing fluid volume within the cavity in turn either increases or reduces the pressure on the gas bubble inside the ludion, which being compressible, increases or decreases in volume thus changing the buoyancy of the ludion and causing it to sink or rise. In many embodiments, the pressure applied to the system in combination with the hydrostatic pressure, as a result of the movement of the ludion, will cause the ludion to move within the two fluid system (e.g., deeper into the second (higher density) fluid as the pressure increases). In many embodiments, as the ludion moves deeper into the second fluid, the gas bubble may transition to below the vinculum.

Although the above has focused on the container, the ludion, and the fluids and gases interacting with the ludion, it will be understood that other components may also be incorporated into a functional pressure sensing apparatus, including, for example, a sensing apparatus to determine the relative position of the ludion within the container. For example, in many embodiments the sensing apparatus may include an optical device for imaging the position.

Embodiments of System Fluids

To ensure the system is capable of operating at desired conditions, many embodiments incorporate the following configurations for both fluids:

Must be of different densities,

Must be immiscible, such that the less dense fluid floats above the denser fluid and does not mix to become a homogeneous mixture and a vinculum exists.

Must be practically incompressible, such that system variations with pressure are isolated to effects on the gas entrained in the ludion.

According to many embodiments of a two fluid system, the following configurations are selected for the first fluid 260, as shown in FIG. 2:

Must have a vapor pressure lower than the lowest pressure the overall system is to operate within.

In embodiments of apparatus and systems capable of measuring very low pressures (e.g. lower than 0.25 psi), the height of the first fluid 260 is selected such that the lower fluid (270 in FIG. 2) is prevented from reaching its boiling point within the operating temperature and pressure ranges of the second fluid. For example, in many such embodiments, the amount of the first fluid is selected to be sufficient to provide pressure equal to the operating vapor pressure of the second fluid.

Advantageously, it has been discovered that configuring the properties of the first fluid within these guidelines provides systems and apparatus capable of measuring the pressure on a triple point device. Triple point device refers to a feature of materials where the temperature and pressure of the material is such that the material coexists in the solid, fluid, and gas phases. Such a device may be used in connection with the embodiments of the system as a calibration point of the pressure.

The density of both the first and second fluids must be correlated with the density of the ludion. If both fluids are denser than the ludion material, the ludion will float on top of the upper fluid (260 in FIG. 2) and never traverse across the vinculum into the second fluid as pressure is applied to the system. If both fluids are less dense than the ludion material, the pressure measuring range of the device will be limited. Above some critical pressure the ludion will sink to the bottom of the second fluid, under the vinculum. Selecting an upper fluid less dense than the ludion material and a lower fluid denser than the ludion material will increase the likelihood that the ludion is able to operate at the largest range of pressures.

Figure 3:
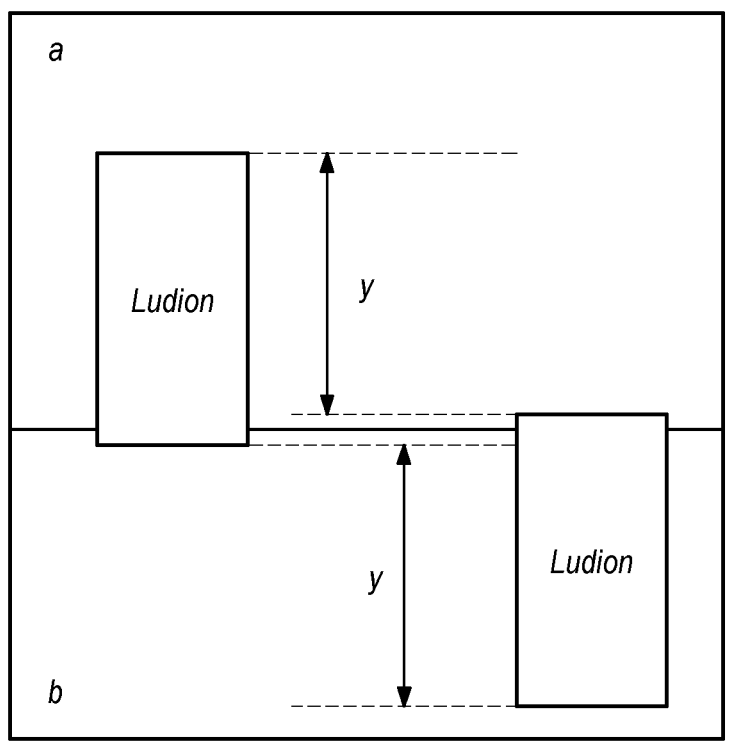
FIG. 3 illustrates an exemplary ludion and ludion system with fluids of similar density in accordance with various embodiments of the invention.

Furthermore, according to some embodiments, the precision of the system can be increased by selecting fluids such that the densities are as similar as possible, as shown in FIG. 3. However, a tradeoff for this selection is the decrease in range of measurable pressure ranges.

In many embodiments, at least one of the fluids is fully transparent or operationally transparent with respect to the chosen measurement device. For example, a Michelson Interferometer may be utilized to measure the displacement of the ludion. As illustrated and described in greater detail below with respect to FIGS. 11 to 13, the interferometer operates with a laser device. Accordingly, in such embodiments, the selected fluids would be transparent to the frequency(ies) of the laser light used in the laser-producing device of the interferometer. Therefore, it will be understood that the term "transparent" can take on a variety of meanings within the embodiments of the invention depending on the nature of the measurement device chosen to interrogate the position of the ludion within the closed container.

A variety of fluids may be used in accordance with embodiments based on the above guidelines. In many embodiments the fluids are immiscible, comprising, for example, polar and one non-polar fluids. Exemplary non-polar fluids may include, for example, decamethyltetrasiloxane, mineral oil, vacuum pump oil, etc. Exemplary polar fluid may include, for example, propylene glycol (propane-1,2-diol), ethylene glycol, water, etc. Although not required, fluids of appropriate density, immiscibility, compressibility and transparency may be chosen for other ancillary properties.

Embodiments of System Gases

As previously discussed, each component of the system must be carefully selected and designed for the precision measurement of the movement of the ludion within the fluids. This precision also includes the selection of the proper gas to be entrained within the ludion 140 and the pressure head 250 of the system, as shown in FIG. 2. For example, if the gas selected chemically reacts with the fluids of the system, the number of molecules of the gas may alter the buoyancy of the system and introduce errors beyond acceptable limits, thus jeopardizing the calibration of the system. An example would be $CO_2$, which is known to react with water to form carbonic acid. In accordance with embodiments, gases that are chemically inert to, or avoid fast reactions with, the system fluids and other materials are chosen.

Another effect that is considered in many embodiments is the dissolution rate of the system gases with the fluids. The rate of gas dissolution is temperature dependent and characterized by a solubility constant ($K_{sp}$) and described by Henry's Law. These constants are well known in the art for most gases and readily determinable for all others through routine experimentation. Accordingly, in many embodiments the temperature history of the system is tracked such that the dissolution rate of the gas into the fluid may be calculated and an appropriate correction factor applied to all measurements. In many embodiments, the gas within the ludion is selected to dissolve into the fluid at a very low rate over the range of operating temperatures such that such recalibration may be minimized.

A variety of gases may be used in accordance with embodiments based on the above guidelines. In accordance with many embodiments, an inert gas, such as a noble gas, may be used. Such noble gases, for example Helium, are useful because they are inert chemically, have low rates of dissolution into fluids, and have the smallest changes to their solubility constants as the temperature changes. Inert noble gases, such as Helium, are additionally preferred because they most closely approximate an ideal gas, which simplifies the calculation of the measured pressure.

Temperature Control in Systems and Apparatus

Understanding the effects of temperature on the gas(es) and fluid(s) within the system allows one to obtain even more precise pressure measurements using embodiments of a ludion apparatus/system. Changes in temperature can be a result of the external environment or due to the applied pressure of the system. An increase in temperature of the gas(es) and fluids cause them to change density or expand and increase their volume, thus affecting calibration, buoyancy, and position of the ludion within the system. For example, water had a maximum density at 4° C. These changes can be compensated for by selecting volumes and geometries of systems, however, many embodiments include systems and apparatus to monitor and maintain the temperature of the system prior to and throughout system operation.

In accordance with some embodiments, temperature control is maintained by controlling the surrounding system temperatures. Such control may be regulated by using suitable refrigeration and/or heating elements. These elements may be active (e.g., refrigeration devices) or passive (e.g., submerging the system in an ice slurry) such that the system temperature is maintained at a constant temperature of 0° Celsius.

Figure 4A:
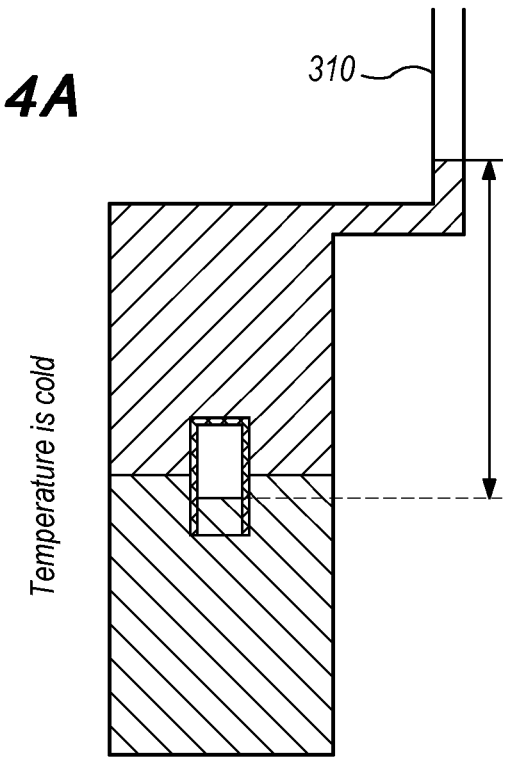
FIGS. 4A and 4B illustrates a ludion with diminished need for temperature control in accordance with embodiments of the invention.
Figure 4B:
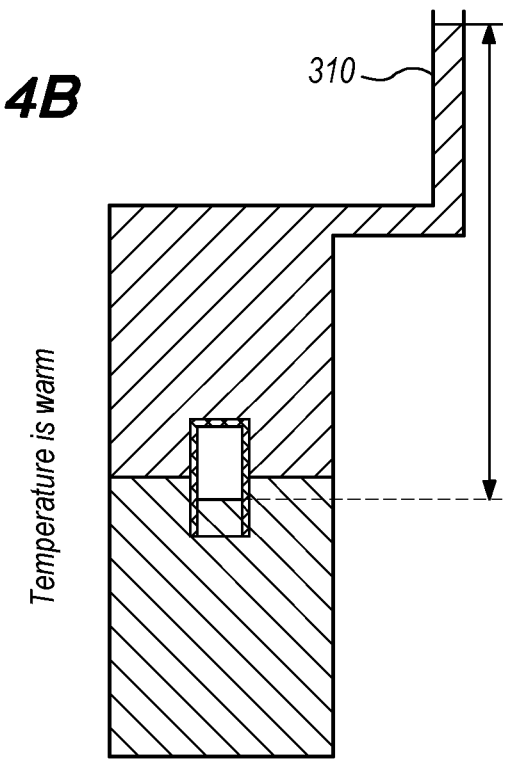

Alternatively, where the overall temperature of the system cannot be maintained within acceptable limits, embodiments of the container 110 and the ludion may incorporate physical design elements such that critical volume of the fluids and gas(es) can be maintained. For example, FIGS. 4A and 4B illustrate a ludion system, according to various embodiments, which incorporates an auxiliary outlet 310. The outlet allows the fluctuation of the volume of fluids as the temperature changes. As the fluids warm, the upper fluid will expand up into the auxiliary outlet. As the fluid cools, the upper fluid will contract and flow down the auxiliary outlet. A specific volume of the fluids and a cross section of the container is selected such that the ludion is in a desired position within the system and such that the increased volume per degree of temperature expands into the auxiliary outlet can be controlled. As the volumes of the fluids change and flow in/out of the auxiliary outlet, the position of the ludion can remain unchanged.

As the fluids warm, the gas bubble within the ludion will also warm and expand in volume. However, as illustrated in FIGS. 4A and 4B, the incorporation of the auxiliary outlet advantageously increases the hydrostatic pressure of the upper fluid, potentially preventing the gas bubble volume from expanding. A greater hydrostatic pressure can be achieved by selecting a specific cross-section of the auxiliary outlet, such that the expanded fluid in the auxiliary outlet achieves a specific height relative to the crown (a narrower cross-section of the auxiliary outlet will achieve taller fluid heights). Accordingly, the design of the system can account for changes in temperature such that as the critical volumes of the fluids and gas bubble can be maintained thus maintaining the desired position of the ludion.

Embodiments of Ludions

As has been illustrated by the above discussion, in embodiments of the apparatus and system, each component works with the other to produce the most precise measurement possible within the system parameters. The design of the ludion can dramatically affect the precision of the system. In accordance with many embodiments, the ludion 130 may take on the shape of an inverted cup. When properly inserted into the system and positioned between the two fluids, such as in FIG. 2, the ludion 130, as with a single fluid system, will have a bubble of gas 140 near the top 220 of the ludion. The bubble of gas 140 creates an interface 280 at boundary of the second fluid 270 that may be referred to as a crown. The overall position of the ludion within the system is dependent on the mass and buoyancy properties of the ludion, the bubble volume, and densities of the fluids and gas bubble. Such properties are largely dependent on the material properties and physical design of the ludion.

Variants of Ludion Density

As previously discussed, the selection of fluids in relation to the selection of ludion material can have various effects on the ability of the system to accurately measure pressure. For example, in some embodiments the ludion may be formed of a glass or silica like structure yet in other embodiments the ludion may be formed of an acrylic or plastic. The selection of material used for the ludion should be based on density as compared to the density of the fluids selected in the container. Density will affect the buoyancy of the ludion, its displacement within the fluids, and thereby affecting the precision of vertical displacement measurements. Ideally, the density of the ludion material should be such that it is lower than the first fluid (lower density) and greater than the second fluid (higher density). This will prevent the ludion from floating to the top of the container or sinking to the bottom of the container beyond a critical pressure, a phenomenon to avoid if the ludion design incorporates a cup to float a reflective surface (described in more detail in 0058). For example, if the density of the ludion material is higher than the second fluid (higher density fluid), it will sink to the bottom system when any applied pressure surpasses a critical pressure.

Variants of Ludion Cross-section

Figure 5A:
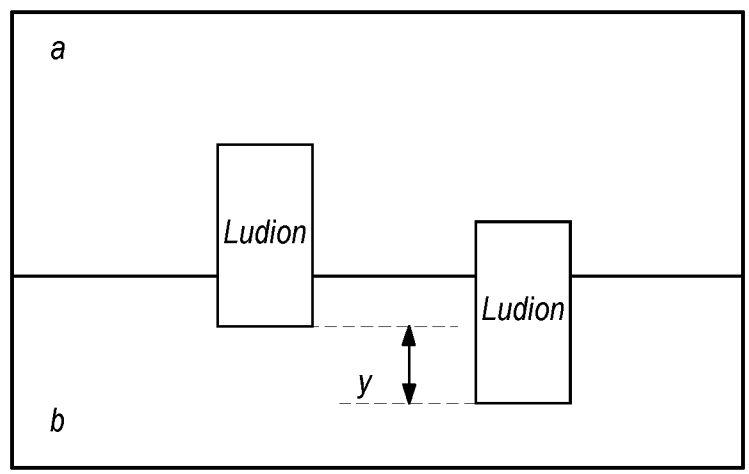
FIGS. 5A and 5B illustrate exemplary ludions in accordance with various embodiments of the invention.
Figure 5B:
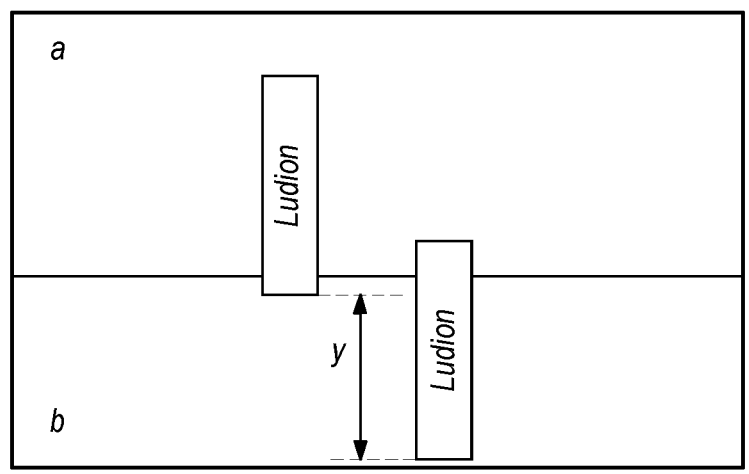

FIGS. 5A and 5B, illustrate the effect of ludion width on the precision of the system. As can be illustrated, the selection of the ludion cross-section itself can affect the precision of the system, because the narrower ludion (FIG. 5B) will show a larger displacement over the same pressure change when compared to the wider ludion (FIG. 5A). In other words, as the cross section of the ludion decreases, the precision of the system increases. (To accommodate for a larger displacement, a ludion with a narrow cross-sectional area would require the ludion to be longer.)

Although, these effects are general, there are some tradeoffs in selecting a narrower cross section ludion as opposed to a wider size, as well as selecting fluids with densities close together. As the width of the ludion decreases, as illustrated in FIG. 5B, the measureable range of pressures will also decrease. Similarly, as the densities of the two fluids get closer together, the range of pressures that can be tested is also decreased. Accordingly, apparatus and system design must consider whether a larger measurable range or greater precision over a narrower range is desired. Alternatively, a system may be constructed having multiple ludion/fluid system designs such that some elements provide measurement over a large range of pressures while others focus on providing precision over specific narrow ranges.

In accordance with many embodiments, the horizontal outside cross-sectional area (oxL) of the ludion may also be configured for specific applications. The shape of the ludion can be varied to produce desirable effects, specifically as it applies to varying the outside cross sectional area of the ludion along its length.

In general, embodiments of the system measure the movement up and down of the ludion as an external pressure is changed and, assuming the bubble is an ideal gas, translates this into a pressure change by using Boyle's law:

$$P_1 V_1 = P_2 V_2 \quad (EQ.\ 1)$$

where $P_1$ and $P_2$ are known from calibration and $V_2$ is calculated with the equation:

$$\Delta V = ((y)(oxL)(\rho_b - \rho_a))/\rho_b \quad (EQ.\ 2)$$

Based on these equations the measured pressure is:

$$P_2 = \frac{P_1 V_1}{V_1 - \Delta V} = \frac{P_1 V_1}{V_1 - \frac{(y)(oxL)(\rho_b - \rho_a)}{\rho_b}} = \frac{P_1 V_1 \rho_b}{V_1 \rho_b - (y)(oxL)(\rho_b - \rho_a)} \quad (EQ.\ 3)$$

These results suggest that a ludion may be constructed such that a change in vertical position could relate to the pressure based on a variety of mathematical relationships. For example, EQ. 3 suggest the relationship between the change in ludion position and the pressure would be linear. To explain how this solution is reached, first assume a linear solution exists such that $P_2 = ky$, where k is a constant that determines the vertical change to correspond to the change in pressure. The assumed solution is then set to what our system relationship is known to be:

$$ky = \frac{P_1 V_1 \rho_b}{V_1 \rho_b - (y)(oxL)(\rho_b - \rho_a)} \quad (EQ.\ 4)$$

where it is assumed that:

$$A = P_1 V_1 \rho_b,\ B = V_1 \rho_b, \quad (EQ.\ 5)$$
and, $$C = (\rho_b - \rho_a) \quad (EQ.\ 6)$$

then $$ky = \frac{A}{B - y(oxL)C} \quad (EQ.\ 7)$$

which leads to:

$$Bky - ky^2 C(oxL) = A \quad (EQ.\ 8)$$

then to:

$$\frac{Bky - A}{ky^2 C} = (oxL) \quad (EQ.\ 9)$$

where $$oxL = \frac{B}{Cy} - \frac{A}{ky^2 C} \quad (EQ.\ 10)$$

which turns into $$oxL = \frac{V_1 \rho_b}{(\rho_b - \rho_a)y} - \frac{P_1 V_1 \rho_b}{ky^2(\rho_b - \rho_a)} \quad (EQ.\ 11)$$

when all abbreviated expressions are substituted.

Based on these equations it is possible to see that if the cross sectional shape of the ludion were circular then the radius as a function of the y position on the ludion would be:

$$r = \sqrt{\frac{\frac{V_1 \rho_b}{(\rho_b - \rho_a)y} - \frac{P_1 V_1 \rho_b}{ky^2(\rho_b - \rho_a)}}{\pi}}. \quad (EQ.\ 12)$$

Accordingly, to achieve a linear response given an initial volume and initial pressure used during calibration, a ludion having a specialized shape may be provided.

Variants of Center of Mass/Buoyancy

Figure 6:
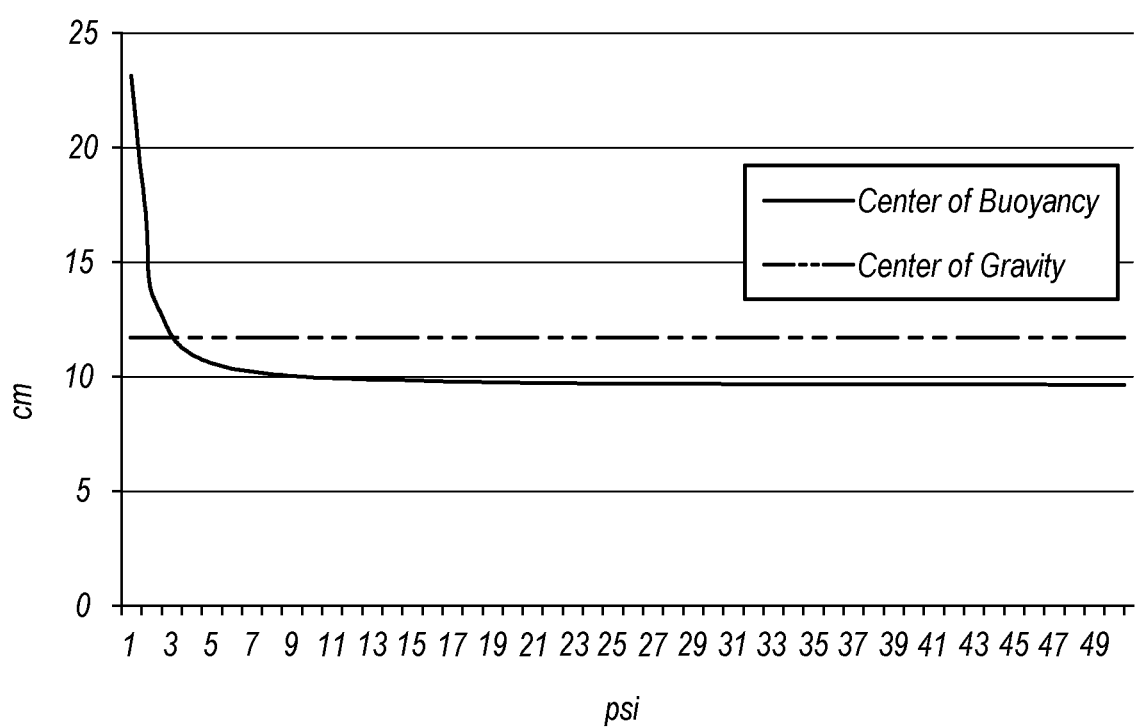
FIG. 6 is a graphical illustration of the variance of center of gravity and center of buoyancy in accordance with various embodiments of the invention.

Another element of ludion design to consider is the center of gravity of the ludion relative to the center of buoyancy of the ludion$_{sys}$, which is determined through choice of materials, overall ludion shape, and initial gas bubble volume. The ludion's center of gravity never changes throughout apparatus operation. However, center of buoyancy of the ludion$_{sys}$ does change throughout apparatus operation, where ludion$_{sys}$ mass will increase or decrease as fluid is pushed in or forced out as it traverses through the fluids as a result of applied pressure, as shown in FIG. 6. Notice in the data plot that the ludion's center of gravity remains constant throughout operation, whereas the center of buoyancy shifts. From 1-3 psi, the ludion$_{sys}$ center of buoyancy is above the center of gravity and the ludion will remain fully upright. Beginning 4 psi, the mass of ludion$_{sys}$ has increased such that center of buoyancy is now below the center of gravity, at which point the ludion will begin to slant/rotate to achieve equilibrium.

In short, when the center of buoyancy is above the center of gravity, the ludion will remain fully upright. When it is not, the ludion will attempt to rotate until it achieves equilibrium, perhaps slanting or turning over. Such movement will negatively affect the desired outcome, either releasing the bubble from within the ludion cavity or reducing the measurement precision of the ludion's vertical displacement. Accordingly, in many embodiments, the center of buoyancy of the ludion is configured such that the ludion remains fully upright (level) throughout its vertical travel such that the most accurate measure of vertical displacement can be obtained.

Figure 7A:
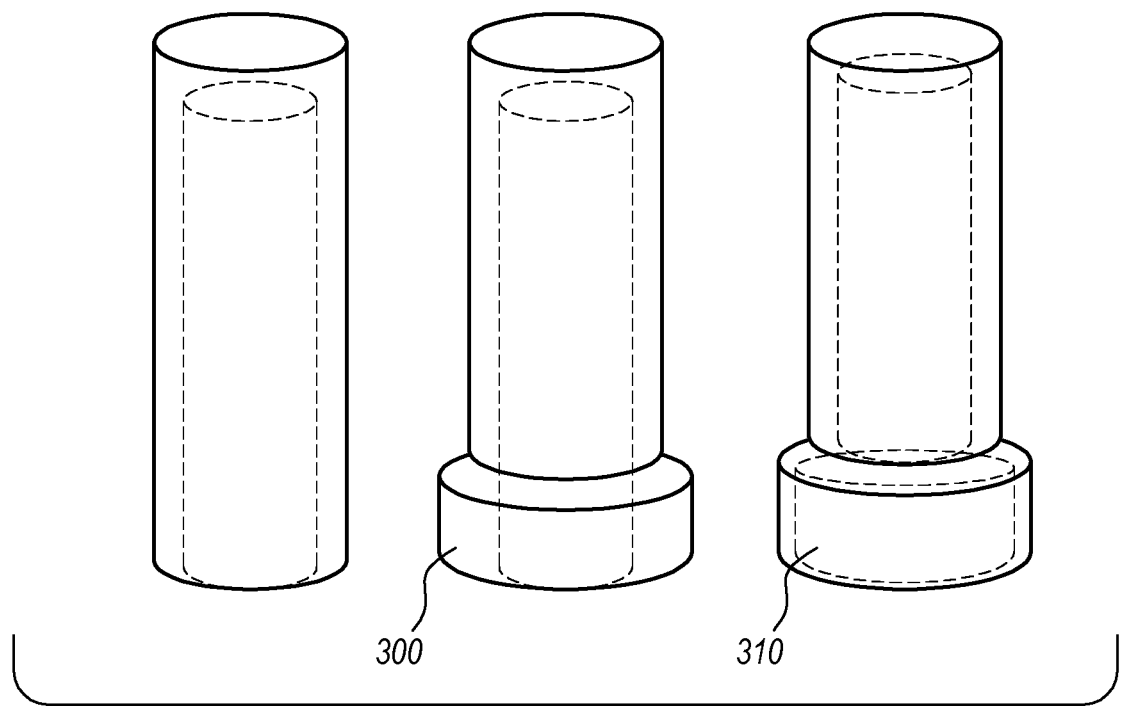
FIGS. 7A to 7C illustrate various embodiments of ludions in accordance with various embodiments of the invention.

In accordance with many embodiments, the ludion may take on a variety of configurations such that the center of mass and buoyancy of the ludion prevent rotation of the ludion during operation. In many embodiments, the radial and linear dimensions may vary as well as the internal and external dimensions. Regardless of the specific ludion design, the overall goal of obtaining the most stable movement of the ludion possible remains constant. In some embodiments, as shown in FIG. 7A, the bottom portion of the ludion is configured to weigh more (have more mass) than the top of the ludion, such as by expanding the thickness of the lower ludion wall 300 and/or expanding the volume of the lower portion 310 of the internal cavity of the ludion, to prevent slanting or rotation, as shown in FIG. 7A (center and right).

Figure 7B:
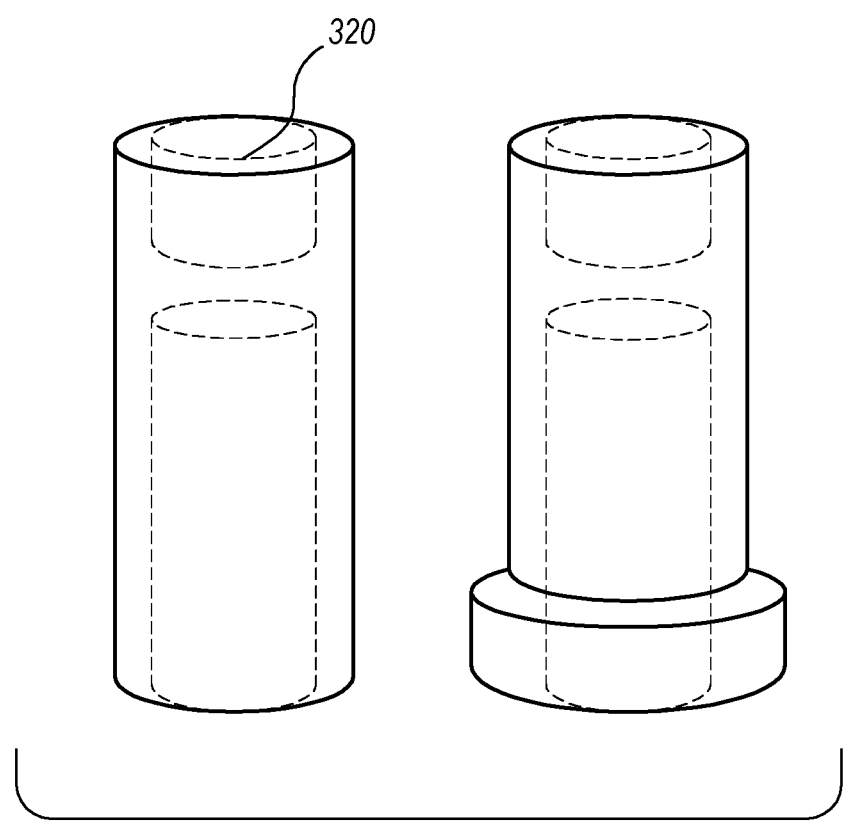
Figure 7C:
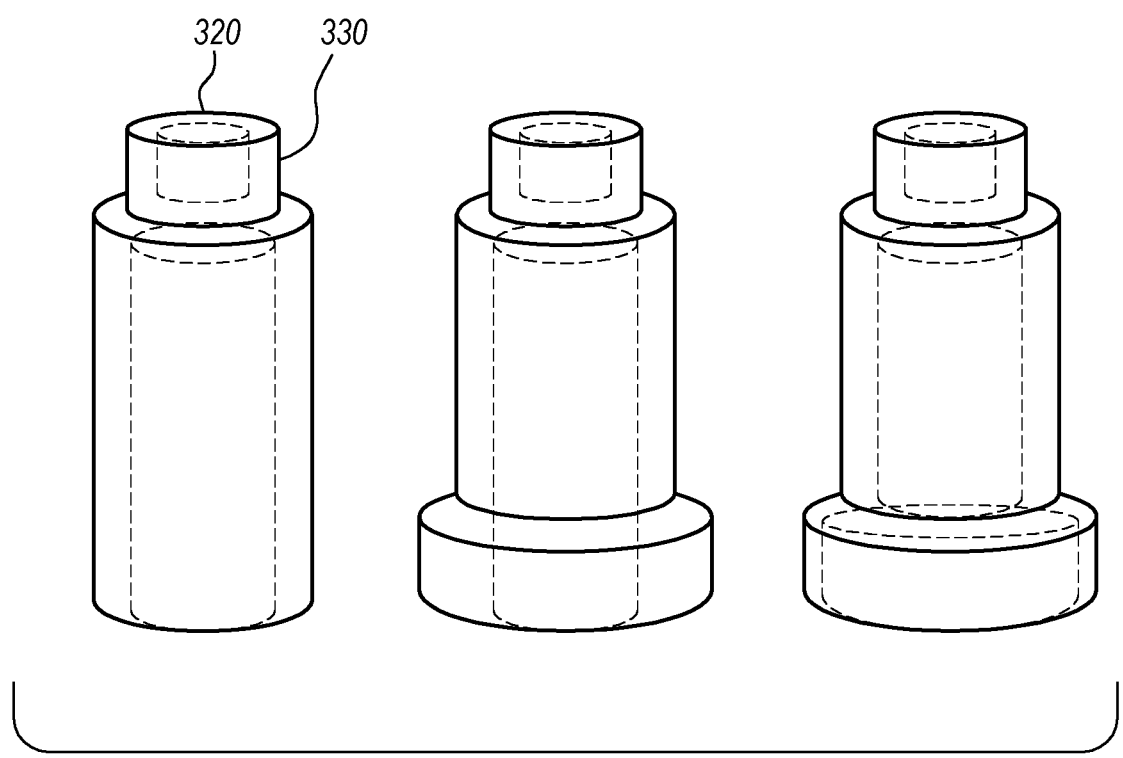

In some embodiments, the center of gravity and center of buoyancy may be affected by the addition of a reflective surface used for position detection. Used for interferometry, the reflective surface, such as a silicon wafer, silvered surface, Bragg coating, corner cube, etc., can be attached to the top of the ludion, disposed (floated) within a cup within the ludion (as shown in FIG. 7B), or disposed (floated) in a cup 330 on top of the ludion (as shown in FIG. 7C). This wafer, in addition to glues, fluids, and a cup to hold the fluid and wafer, increases mass to the top of the ludion and to the overall ludion$_{sys}$, thereby changing the center of gravity and center of buoyancy. In many embodiments, the dimensions of these elements of the ludion are configured to ensure the stability of the ludion during apparatus operation. Ludion embodiments, which include the cup and floating wafer, also have material density parameters to consider in the configuration process. As previously discussed, if the ludion material density is lower than the second fluid, the ludion may sink to the bottom of the container, potentially forcing the wafer and fluid out of the cup, rendering the interferometry and measuring capability of the system useless.

Figure 7D:
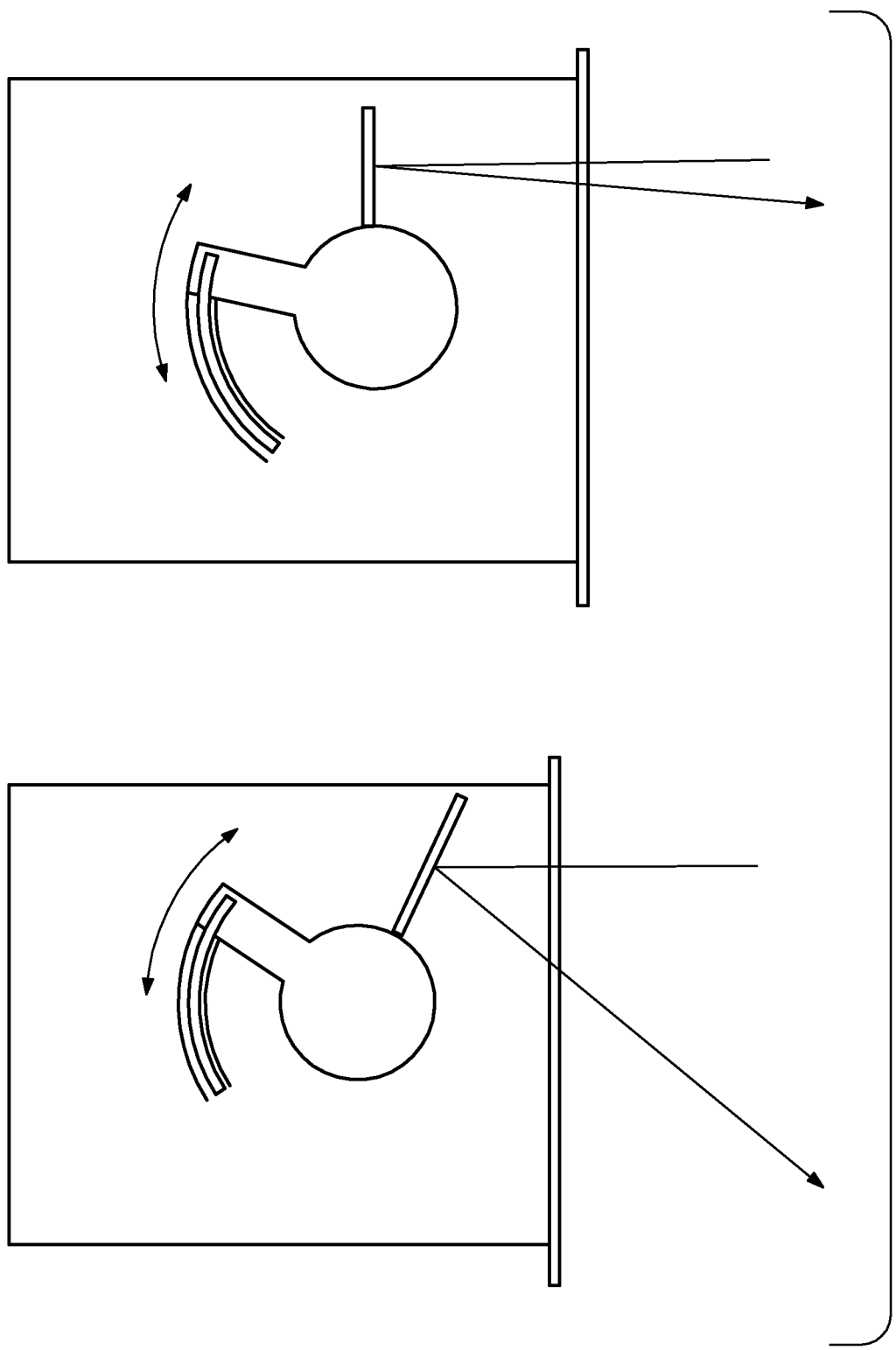
FIG. 7D illustrates an embodiment of a horizontally cylindrical ludion in accordance with embodiments of the invention.

Alternatively, in accordance with some embodiments incorporating a reflective surface, it may be desirable to have a ludion with a horizontally cylindrical shape as illustrated in FIG. 7D. In such embodiments, the ludion may be designed to allow for rotation as the center of mass and buoyancy change relative to the pressure applied on the system. The rotation can be determined via an adapted interferometer system or by an alternative system, which projects the reflected laser beam onto a distant projection screen wherein the reflective surface changes position as the ludion rotates and thus the angle of the reflective surface can equate to pressure applied.

Variants of Bubble Volume

Figure 8A:
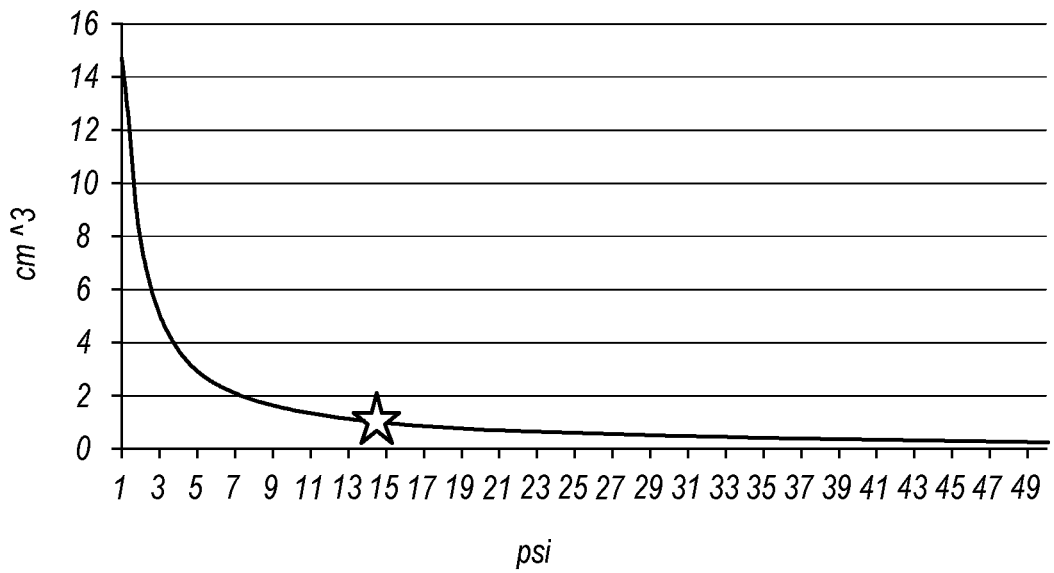
FIG. 8A is a graphical illustration of the relationship between the ludion gas bubble volume and the pressure applied to the system in accordance with various embodiments of the invention.
Figure 8B:
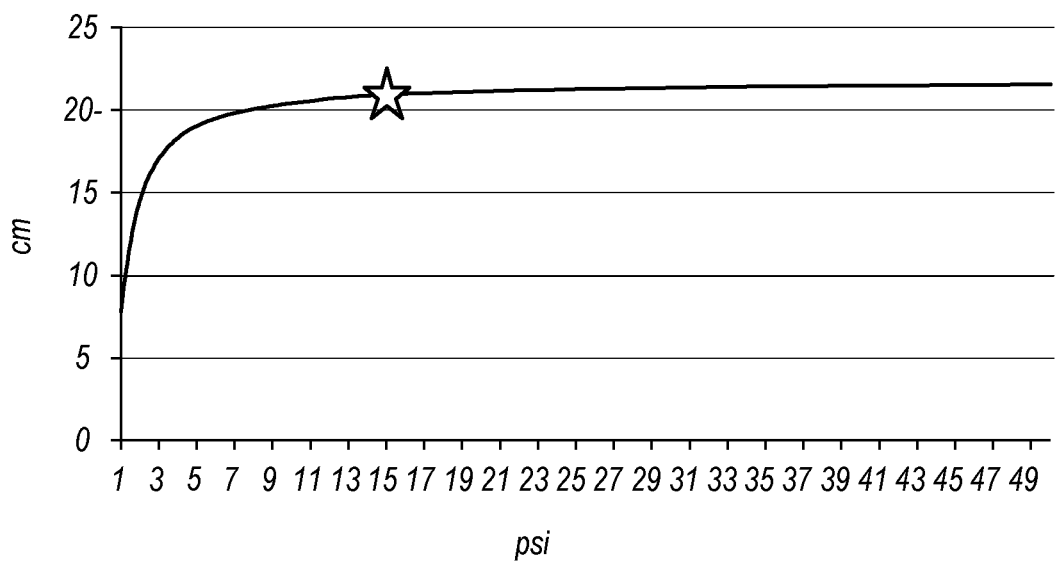
FIG. 8B is a graphical illustration of the relationship between the ludion displacement and the pressure applied to the system in accordance with various embodiments of the invention.
Figure 9A:
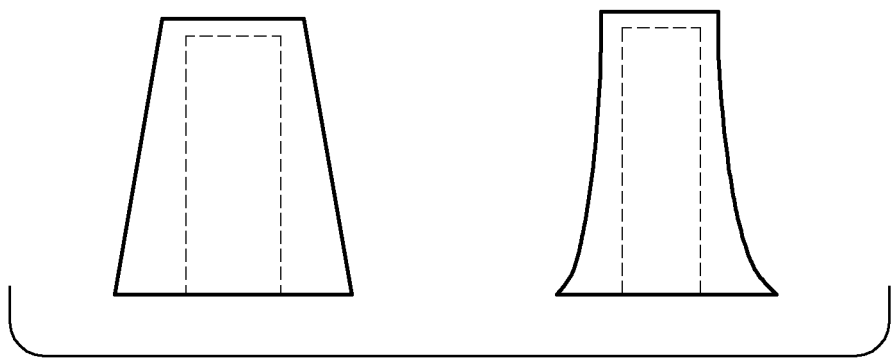
FIGS. 9A-9D illustrate various embodiments of ludions in accordance with various embodiments of the invention.
Figure 9B:
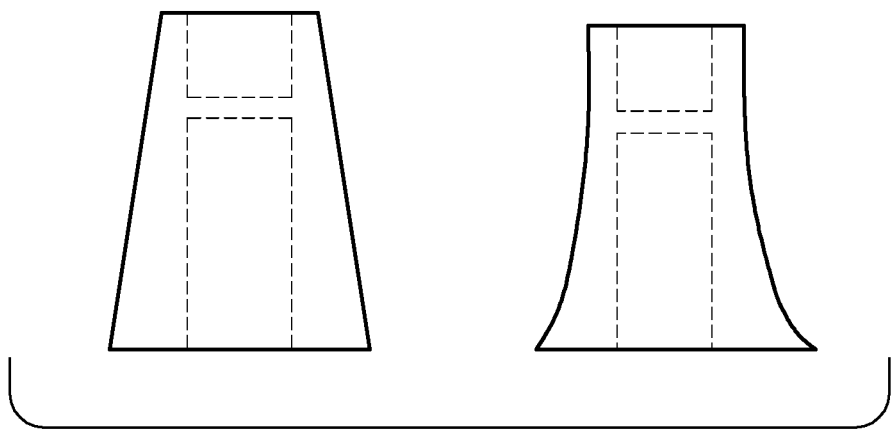
Figure 9C:
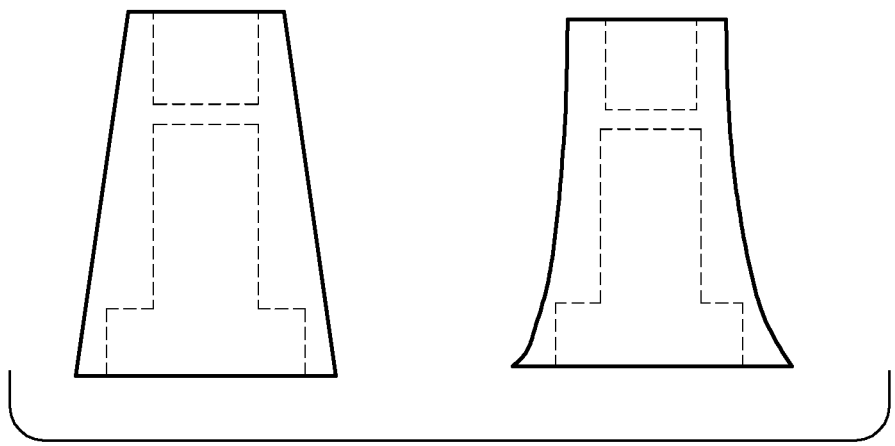
Figure 9D:
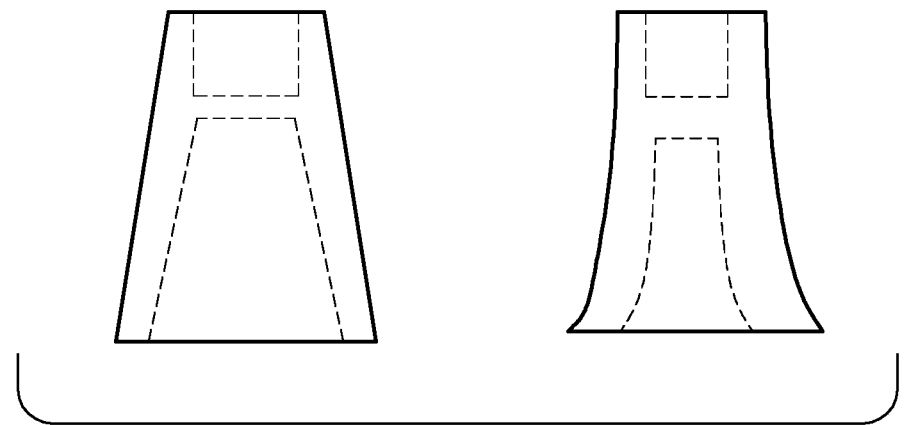
Figure 10:
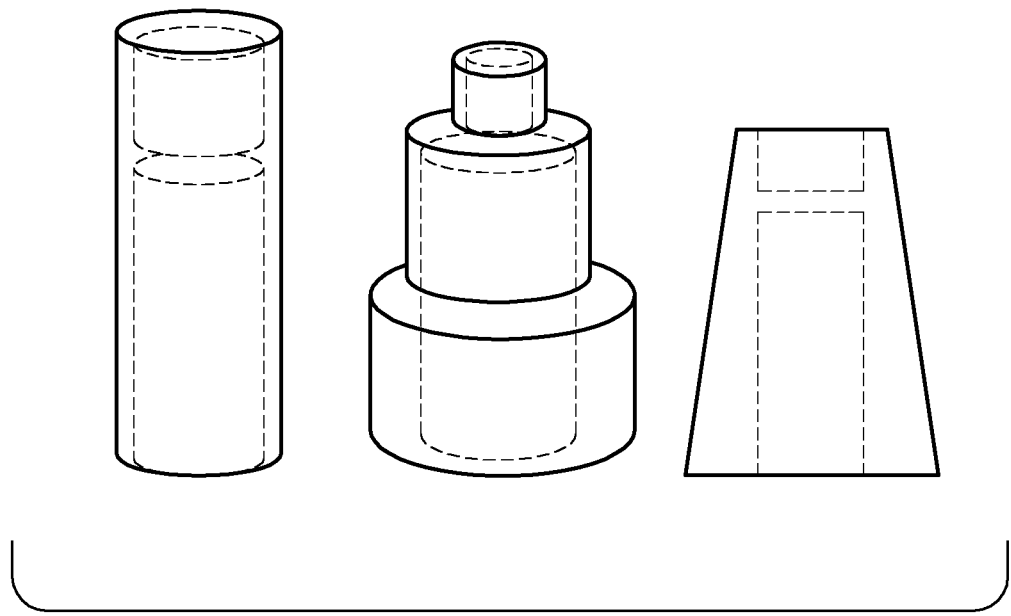
FIG. 10 illustrates various embodiments of ludions in accordance with various embodiments of the invention.

Although the above embodiments have focused on how ludion design may be configured to control the center of mass and buoyancy of the ludion system, ludion design may also be configured to alter the vertical displacement of the ludion with respect to the change in the bubble volume within the ludion cavity. Data plots showing an exemplary non-linear response of bubble volume to vertical displacement is shown in FIGS. 8A and 8B. It can be seen that the bubble size will approach zero in a non-linear fashion. Similarly, the change in position of the ludion may be non-linear with respect to the applied pressure. In some embodiments, these relationships may be adjusted by the design of the ludion in conjunction with the selection of gases and fluids. Accordingly, some embodiments of the system may incorporate ludions having a continuously variable cross section, such that a linear relationship between the pressure change and the ludion's movement can be achieved. Exemplary embodiments of ludions having angled or curved cross-sections are provided as examples in FIG. 9A. These ludions may include reflective elements disposed within ludion internal cavity, as shown in FIG. 9B. Ludions of variable cross-section may also include variable internal volumes (FIG. 9C), and this variance may be continuous across the length of the internal volume (FIG. 9D). Although specific embodiments of ludions have been described above, it should be understood that in accordance the ludion may take on any number of shapes including the inverted cup like structure previously described. Other exemplary embodiments of ludion profiles are illustrated in FIG. 10.

Embodiments of Position Measurement Apparatus and Systems

Figure 11:
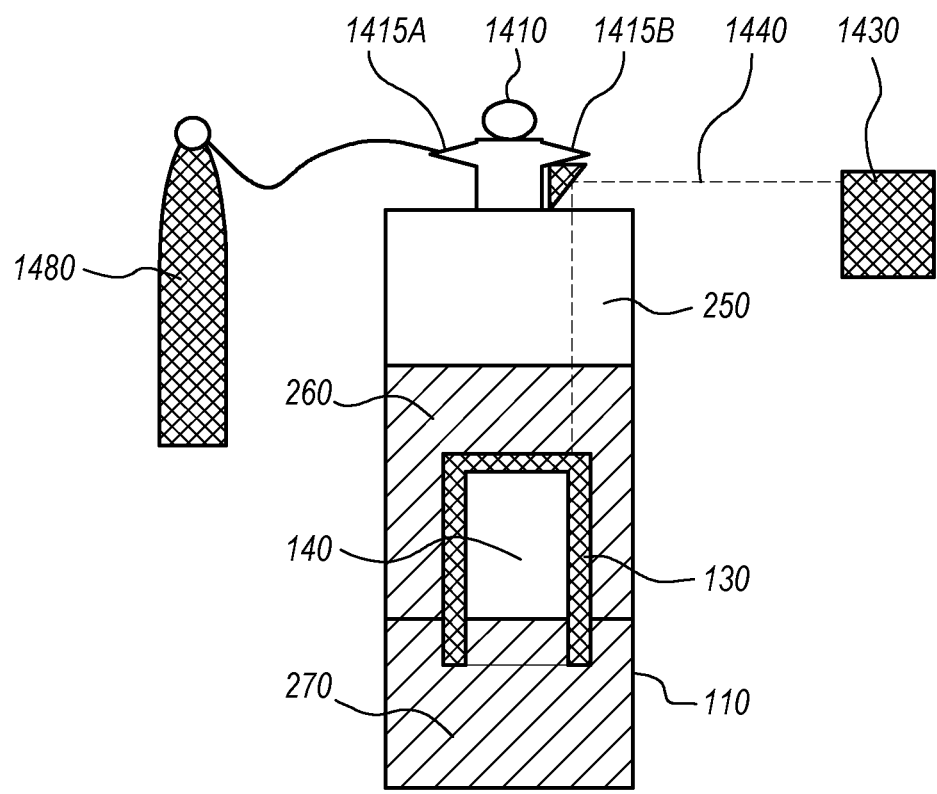
FIG. 11 illustrates a two fluid Cartesian diver system and a measurement device in accordance with embodiments of the invention.

The pressure measurement provided by the system and apparatus is dependent on the ability to determine the precise position of the ludion and to monitor the change in its position over time; many embodiments incorporate a highly precise measurement device. Although such position measurement may be achieved using various methods, in some embodiments a laser producing device 1430, as illustrated in FIG. 11, may be used. In such embodiments, the measurement device directs a beam of light 1440 at mirror or other reflective device, which would, in turn, translate the reflection to the ludion from which changes in position in relation to the changes in pressure could be measured. For example, some portion of the ludion might incorporate a reflective portion such that the beam reflected off the ludion could be monitored.

Although Interferometry is known, it has not been used in conjunction with precision elements of a ludion system described herewith to measure pressure. The interferometer system, which has the ability to measure displacement to 1 nm, in conjunction with a two fluid ludion system, which allows for greater displacement of the ludion per unit pressure changed and thus sensitivity to pressure change, theoretically can produce more precise measurements of pressure than are possible with current state-of-the-art NIST standards.

Figure 12:
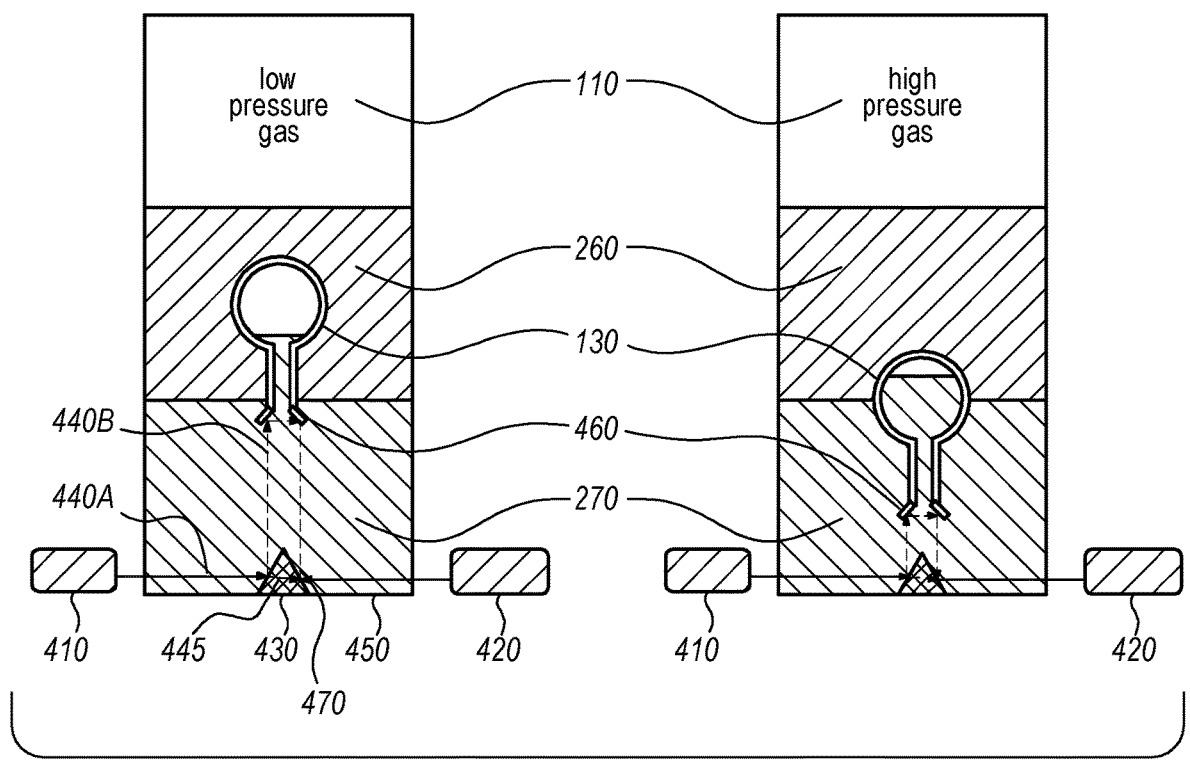
FIG. 12 illustrates the various phases of a two fluid Cartesian diver system and a measurement device in accordance with embodiments of the invention.
Figure 13:
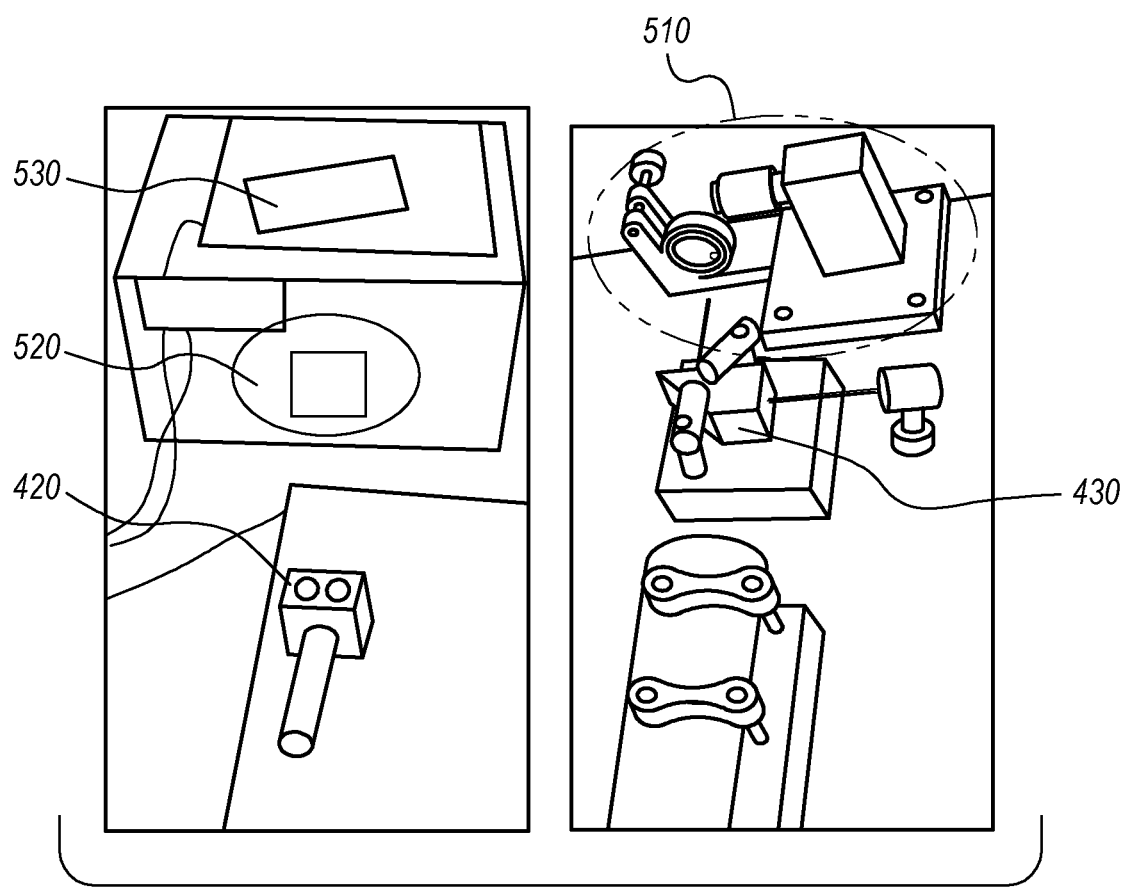
FIG. 13 illustrates a laser-imaging device in accordance with embodiments of the invention.

In accordance with many other embodiments, an exemplary embodiment of a measuring system may include a laser interferometer, as illustrated in various configurations in FIGS. 12 and 13. FIG. 12 illustrates a basic two fluid ludion system in two different stages. The laser imaging device 410 directs a laser beam along a reference leg 440A towards a half silvered mirror or a beam splitter 430. The beam splitter 430 "splits" the beam and directs a portion of the beam along a measurement leg 440B towards the ludion or a reflective surface 460 in relation to the ludion and the other portion 445 continues through the beam splitter 430. The two portions of the beam are recombined at a second point 470 on the beam splitter and may generate an interference pattern 450 received by a detector 420. In FIG. 13, the interference pattern 520 is a result of the two portions of the beam constructively and destructively interacting with each other. The counter 530 is used to calculate the distance moved, as described in detail below. This type of interferometry is commonly known as Michelson Interferometry, and can be used to determine positional change in the ludion with great precision. Although the interferometer description provided above relates to Michelson Interferometry, other forms of interferometry may also be employed in the precise measurement of the change of vertical displacement of the ludion as a result of a pressure change, including but not limited to a heterodyne interferometry configurations utilizing a 2 frequency laser and an optical receiver to measure the beat frequency shifts between the two frequencies into changes of displacement.

In many embodiments, the laser-imaging device 410 or 510, as shown in FIG. 12 or 13, may vary depending on the overall design of the system. Most lasers do not have perfectly stable operating frequencies and as such may change frequencies periodically during operation. For example, a laser may change frequency every nanosecond. That change in frequency would equate to a coherence length of 0.3 m or 30 cm based on the speed of light. In other words, the frequency of the laser would change every 30 cm of length of the laser. The coherence length is essential to the overall design of the system because if the frequency of the laser image produced from the laser imaging device 410 is different from the frequency of the laser reflected off the ludion then the recombined laser at the reference point 470 would be out of phase and therefore not produce stable images for measurement. As such, in many embodiments the reference leg and the measurement leg of the system may not vary by more than the coherence length of the selected laser.

In accordance with many embodiments, the laser imaging device 410 may be any variety of lasers most preferably a stabilized laser with a long coherence length such as an Iodine Stabilized Helium-Neon (HeNe) laser.

In accordance with various embodiments, the laser-imaging device 410 in FIG. 12 may be positioned either inside or outside of the container 110. Likewise, in order to maintain the appropriate ratio between the reference leg 440A and the measurement leg 440B with respect to the coherence length, the positions of the laser imaging device 410, the beam splitter 430, and the detector 420 may be located within or outside the system.

In accordance with many embodiments, the reflective surface 460 may take on a variety of forms that are suitable for the selection of fluids and ludion design. For example, the reflective surface may be mounted to the end of the ludion as illustrated in FIG. 12. In other embodiments, the reflective surface may be in the form of a reflective wafer located within the hollow portion of the ludion, referred to as the "cup". In some embodiments, the reflective wafer may be mounted to the ludion itself or may be positioned to be disposed at the crown of the second fluid. In yet many other embodiments the reflective surface may take on the form of a prism like structure capable of maintaining total internal reflection and directing the beam of light to a target. Likewise, in some embodiments of the interferometer the beam splitter 430 may be located within the container of fluids 110 while in other embodiments the beam splitter may be located remotely outside the container 110. It should be understood that the interferometer and the reflective surface may take on any number of configurations capable of producing a precise pressure measurement.

Figure 14:
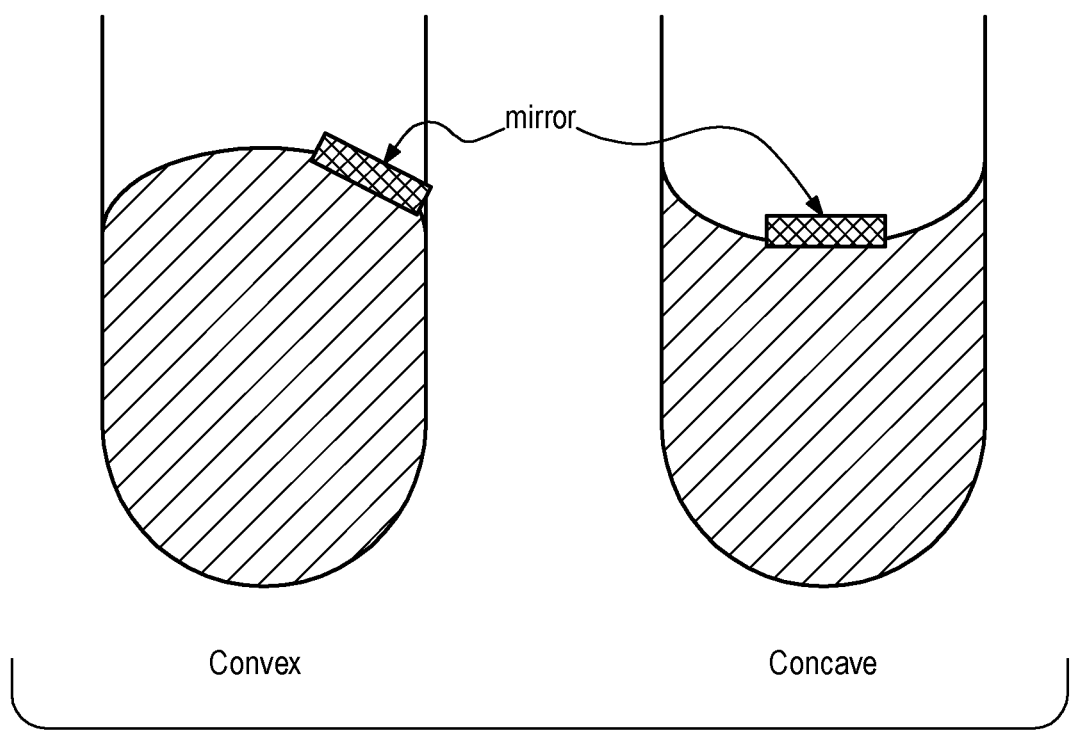
FIG. 14 illustrates a schematic of concave and convex meniscus in accordance with various embodiments of the invention.

In accordance with some embodiments incorporating a reflective surface disposed (floating) within the ludion (such as in a "cup" 320 in FIGS. 7B and 7C or at the crown 280 in FIG. 2), the surface of the fluid in which the reflective surface floats upon (the meniscus) must be concave and not convex. If that surface is convex, the floating reflective component will not maintain a level position and will not reflect the laser to the desired location for the interferometer to measure. This can be seen schematically in FIG. 14, which shows that if the meniscus of the fluid is convex the lowest point will be at the edge, and so the floating mirror will move to the side of the container and will not remain stationary or perpendicular to the force of gravity, whereas with a concave meniscus the stable point is in the center of the meniscus and the floating mirror will stay stationary and remain perpendicular to the force of gravity.

The interference pattern as described above can better be understood and illustrated in FIG. 13. FIG. 13 illustrates the various elements of a Michelson interferometer creating an interference pattern 520. The interference pattern 520 as illustrated in FIG. 13 may have alternating light and dark bands caused by the constructive and destructive interaction between the laser beams. The alternating light and dark bands will fluctuate and change as the position of the ludion changes in response to changes in pressure. A change at one point in the interference pattern from maximum brightness to minimum brightness (or vice versa) corresponds to a movement equal to ¼ the wavelength of the laser being used. For example, a red HeNe (Helium Neon) laser has a wavelength of approximately 633 nm, a change in the interference pattern from dark to light or light to dark corresponds to a movement of approximately 158 nm. This minimum measurement displacement can be changed by using a different wavelength of light, a more sensitive optical sensor, multiple optical sensors to give better gradations between the maximum brightness and minimum brightness for the interference pattern or configuring the optics of the interferometer such that multiple reflections of the laser occur from the moving reflector. The optical sensor is connected to a microprocessor 530 which counts the changes between maximum and minimum brightness in the interference pattern, and multiplies that number by ¼ the wavelength of light used to calculate the distance moved (displacement) of the ludion. In accordance with some embodiments, it may be possible to generate a linear relationship as elements of the system are optimized for such measurements including the physical ludion design (including its density), the density of the fluids, and the volume of gas bubble within the ludion.

For example, since the positon of the ludion measurement is related to the mass of the ludion and the mass of the fluid inside the ludion as well as the densities of the fluids, the change in the ludion positon is best represented by the following equations starting with the force on the system being zero:

$$Y=(((M_{ludion}+M_{LudLiqB})/\pi R^2)-L\rho_A)/(\rho_B-\rho_A) \qquad \text{(EQ. 13)}$$

Where Y is the length of the ludion in the second fluid, $M_{ludion}$ is the mass of the ludion, $M_{LudLiqB}$ is the mass of the fluid inside the ludion, R is the outside radius of the ludion, L is the overall length of the ludion, and $\rho_B$ and $\rho_A$ are the densities of the second and first fluids respectively.

The position of Y will change as $M_{LudLiqB}$ changes and $M_{LudLiqB}$ can be further expressed by $$M_{LudLiqB}=(\pi r^2(L-R+r)-V_{Bubble})*\rho_B \qquad \text{(EQ. 14)}$$

Where $V_{Bubble}$ is the volume of the bubble inside the ludion and r is the inside radius of the ludion. Hence, $M_{LudLiqB}$ will change as the volume of the bubble changes.

Finally, by incorporating Boyle's law of $P_1*V_1=P_2*V_2$ and varying $P_2$ the new bubble volume can be obtained and effectively obtain a new position of Y illustrated in the following equation:

$$Y_2=(((M_{ludion}+(\pi r^2(L-R+r)-((P_1*V_1)/P_2))*\rho_B)/\pi R^2)-L\rho_A)/(\rho_B-\rho_A) \qquad \text{(EQ. 15)}$$

In accordance with other embodiments of the invention, the measurement device may be in the form of a force transducer located within the container and tethered to the ludion. In such systems, the ludion movement will be translated to the force transducer as a change in force on the system, which can be translated to a pressure measurement. Additionally, many embodiments may include fluids that have varying electrical resistance. In such systems, the first and second fluids may contain electrical probes that will correlate the change in electrical current to the movement of the ludion in the system.

In summary, a well-defined ludion system, in accordance with many embodiments of the invention, has the potential to produce pressure measurements that approach the accuracy of the pressure standards maintained at NIST, but offer the ability to disseminate accurate pressure measurements to a much wider audience.

EXEMPLARY EMBODIMENTS

Experiments were conducted to demonstrate the capabilities of the ludion systems and apparatus in accordance with embodiments. These results and discussion are not meant to be limiting, but merely to provide examples of operative devices and their features.

Example 1: Glass Cylinder

Apparatus Description: Liquid A: decamethyltetrasiloxane. Density: 0.876 g/cm$^3$, Liquid B: ethylene glycol. Density: 1.14 g/cm$^3$, Pressure Head: Air, Bubble: Air. Glass Cylinder: Density: 2.47 g/cm$^3$.

Figure 15:
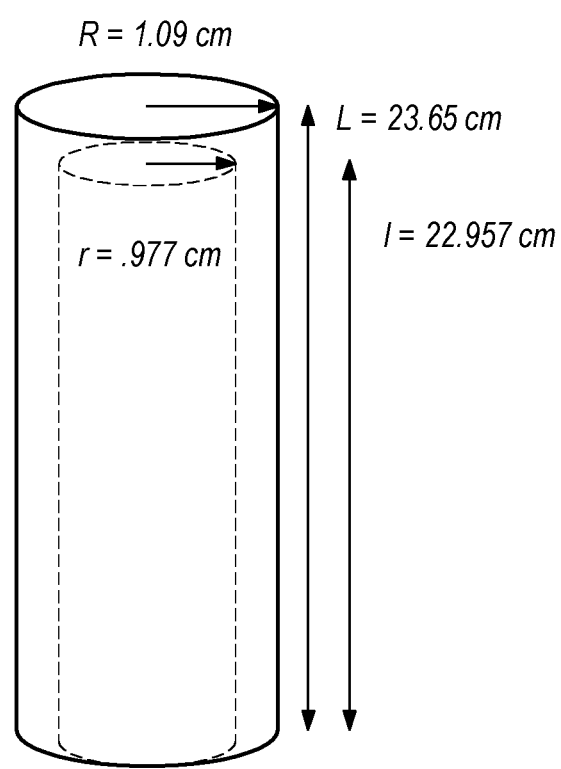
FIGS. 15 to 19 illustrate exemplary ludions in accordance with various experimental embodiments of the invention.

Observations: The apparatus, as shown in FIG. 15, once the ludion was placed into the apparatus, the ludion sank to the bottom, despite given the largest initial bubble volume. The lessons learned are that the material density is significantly greater than Liquid B, causing the ludion to sink; material density should be closer to that of Liquid A and B.

Example 2: Acrylic Rod with Added Weight

Apparatus Description: Density: 1.18 g/cm$^3$ (Mirror glued to ludion for interferometry and weight added to lower ludion between liquids.)

Figure 16:
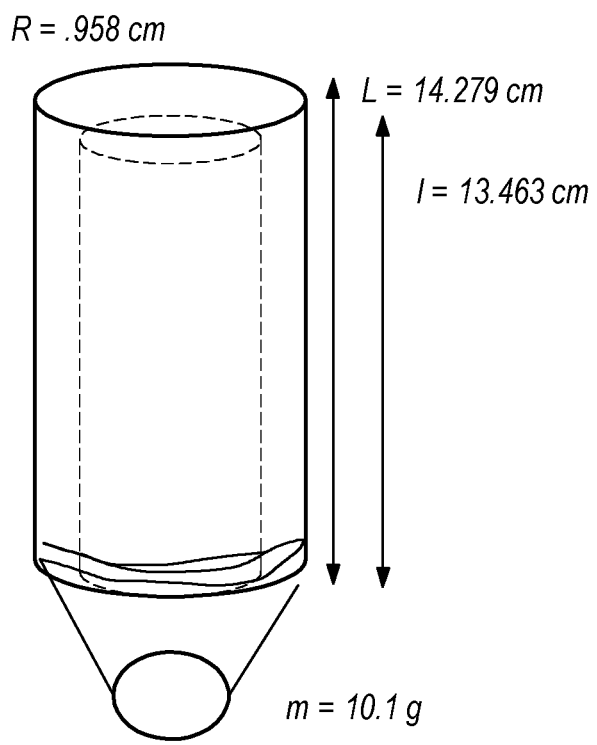

Observations: The ludion, as shown in FIG. 16, was placed into the apparatus with no adjustment to initial bubble volume, and suspended between Liquid A and B, however it was slanted (not fully upright). Vertical movement of the ludion was verified as pressured increased to the pressure head. The lessons learned was the added weight can cause ludion to slant if not properly centered. The affixed mirror can cause the ludion to slant if not properly centered and/or evenly glued. A tool may be required to adjust the initial bubble volume. The "ceiling" inside ludion should be flat (cone shaped due to machining).

Example 3: Acrylic Rod with Affixed Mirror

Apparatus Description: Same as ludion from Example 2 without the added weight.

Observations: The ludion, as shown in FIG. 16, was placed into the apparatus with no adjustment to initial bubble volume, and suspended between Liquid A and B, however it was slanted (not fully upright). Vertical movement of the ludion was verified as pressured increased to the pressure head. The affixed mirror can cause the ludion to slant if not properly centered and/or evenly glued. This experiment demonstrated the need to consider the Center of Buoyancy and Center of Gravity, and the possibility that an outer disk might be helpful to keep the ludion centered within the apparatus for interferometry.

Example 4: Acrylic Rod with Affixed Mirror

Apparatus Description: The ludion from Example 3, including an outer disk with a reflective surface used to center ludion within apparatus and for interferometry reference. Outer disk material is Low-density polyethylene (LDPE) with density 0.955 g/cm$^3$.

Figure 17:
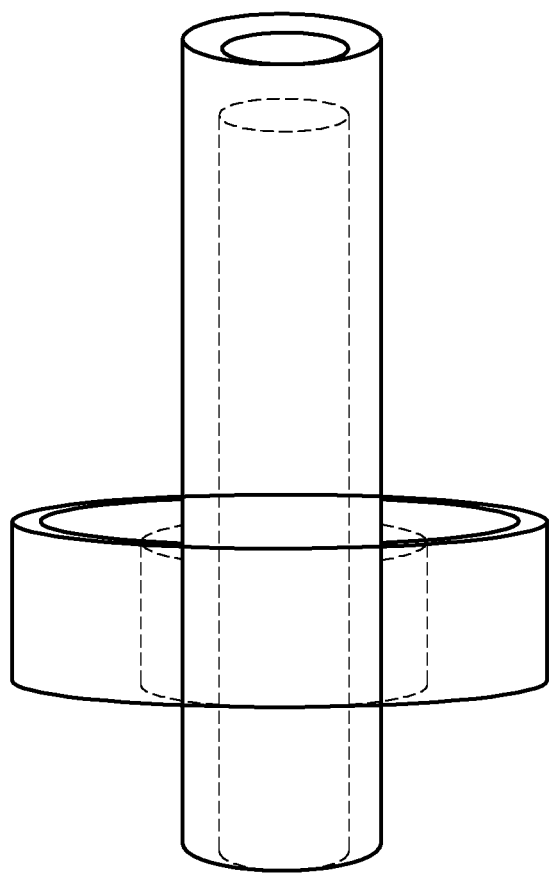

Observations: The ludion with the outer disk, as shown in FIG. 17, was placed into the apparatus. The disk suspended right at the vinculum (between Liquid A and B). Vertical movement of the ludion was verified as the pressure was increased in the pressure head. At higher pressures, ludion sank below the vinculum and the outer disk. When the pressure was released, the ludion rose toward the vinculum, hit the outer disk (ludion did not remain centered) and caused the outer disk to flip. The outer disk was rendered useless for interferometry reference, as agitation was required to re-center the ludion with the outer disk. This experiment shows that an increased height of the outer disk can help to prevent tipping/flipping, and an increase in the inner radius of the outer disk may reduce the potential of collision of the ludion. Other outer disk designs may also be useful in addressing the deficiencies, such as, for example, shaping the inner radius of the outer disk like a funnel to gently re-center the ludion. This experiment also demonstrates the need to consider the drag of the ludion against the outer disk and the drag of the outer disk on the apparatus. This also shows that the mirror could be floated in a cup like shape at top of the ludion to ensure alignment.

Example 5: PVC Piping

Apparatus Description: The ludion including a tube, plug connector and glue with a density of 1.4 g/cm$^3$.

Figure 18:
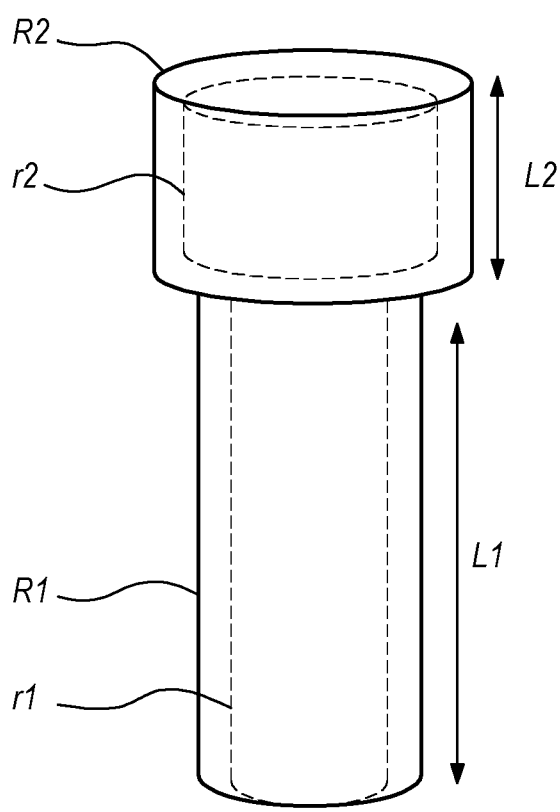

Observations: The ludion, as shown in FIG. 18, was placed into the apparatus with no adjustment to the initial bubble volume. Despite the material density being greater than the fluid, the ludion remained suspended although it slanted greatly with both ends touching the sides of the container. Vertical movement of the ludion was verified as the pressure was increased in the pressure head. The experiment demonstrated that the cup portion is significantly top heavy and consideration of the center of buoyancy and center of gravity in the ludion design is necessary. Due to the ludion slant and the height of cup, the amount of fluid inside the cup needs to be carefully considered to prevent spilling of the liquid/mirror out of cup as well as maintaining center of mirror within the cup for laser.

Example 6: Weighted PVC Piping

Apparatus Description: The ludion from Example 5, including a weight.

Figure 19:
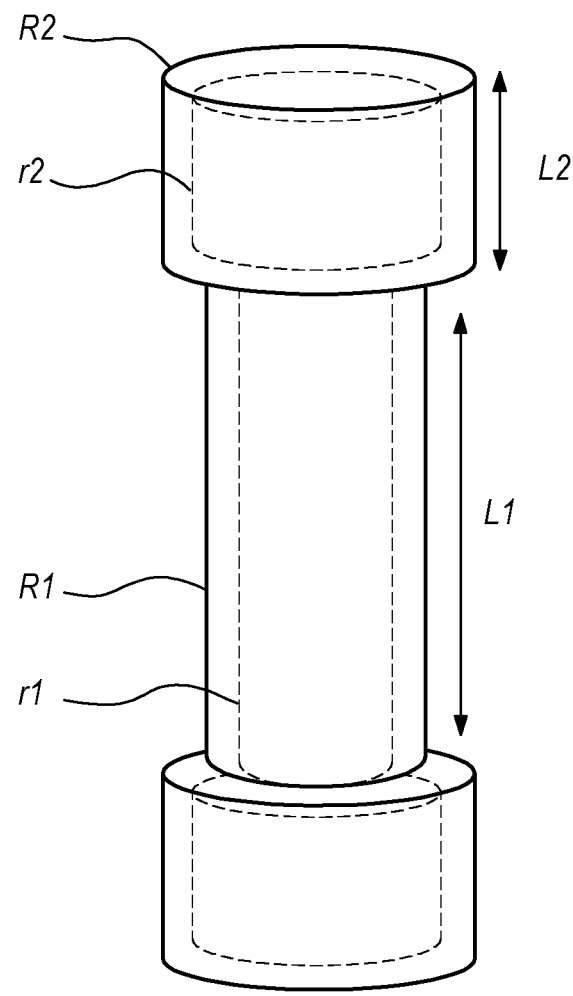

Observations: The ludion, as shown in FIG. 19, was placed into the apparatus with no adjustment to the initial bubble volume. Despite the material density being greater than the fluid, the ludion remained suspended although it slanted greatly with both ends as the added weight was insufficient to bring the ludion fully upright. Vertical movement of the ludion was verified as the pressure was increased in the pressure head. Calculations of the y-displacement show a non-linear rate as the pressure is increased linearly. The experiment demonstrated that the bottom portion of the ludion needs more mass than top (center of buoyancy vs center of gravity). The apparatus and heights of liquids could be increased to accommodate the full length of ludion when in either liquid, or the external shape of the ludion can be modified if a different y-displacement rate is desired.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A pressure measuring apparatus comprising:
   a container having one or more sealable ends defining an internal volume configured to receive at least a first and a second fluid such that the first fluid has a density less than the density of the second fluid wherein a first portion of the internal volume is filled with the first and second fluids such that the first and second fluids are separated by a boundary interface and wherein a second portion of the internal volume is filled with a first compressible gas disposed above the first fluid;
   a vessel having at least one non-sealable opening and at least one sealable portion defining an internal cavity, the vessel being disposed in a downward direction within the internal volume of the container such that the at least one non-sealable opening is disposed in a downward direction and configured to receive at least a portion of the second fluid such that a first portion of the internal cavity is filled with the second fluid and a second portion is filled with a second compressible gas such that the vessel is buoyantly positioned between the first and second fluids, and the boundary interface intersects the vessel at a first pressure, and wherein a change in the environmental pressure of the first compressible gas is communicated to the first and second fluids and the second compressible gas such that as the environmental pressure changes the volume of the second compressible gas changes causing vertical movement of the vessel within the two fluids;
   a precision measurement device configured to measure the movement of the vessel within the two fluids; and
   a measurement translation device in communication with the precision measurement device and configured to receive a movement input data from the measurement device and translate the movement input data to a physical parameter.

2. The pressure measuring apparatus of claim 1, wherein the physical parameter is selected from at least one of the following: a pressure change in the environment, a pressure change in the environment of the container, and the dissolution of a gas into one or more of the fluids.

3. The pressure measuring apparatus of claim 1, further comprising a pressure inducing element configured to induce a pressure change to the container to be communicated to the first compressible gas.

4. The pressure measuring apparatus of claim 1, wherein the vessel is configured to have a center of gravity below a center of buoyancy of the vessel system, the center of buoyancy comprising at least the vessel, the second incompressible gas, and the first and the second fluids over the operating range of the system.

5. The pressure measuring apparatus of claim 1, wherein the measuring device is an interferometer.

6. The pressure measuring apparatus of claim 1, wherein the measuring device is a force transducer, and wherein the vessel further comprises a tether connected between the vessel and the force transducer such that movement of the vessel is communicated to the measuring device.

7. The pressure measuring apparatus of claim 1, wherein the first and second compressible gases are capable of maintaining a constant number of molecules during apparatus operation.

8. The pressure measuring apparatus of claim 1, wherein the first and second compressible gases have a low solubility constant over the operating range of the system.

9. The pressure measuring apparatus of claim 7, wherein the second compressible gas is helium.

10. The pressure measuring apparatus of claim 1, further comprising a first and a second electrical probe, wherein the first electrical probe is positioned in the first fluid, and wherein the second electrical probe is disposed within the second fluid such that when the vessel changes position within the first and second fluids, the change in position will generate a change in current correlated to the change in pressure.

11. The pressure measuring apparatus of claim 5, further comprising a reflective component configured to receive a portion of the reflected light generated by the interferometer.

12. The pressure measuring apparatus of claim 11, wherein the reflective component is disposed within the vessel at a crown line between one of either the second compressible gas and the second fluid, or the between the first and second fluids.

13. The pressure measuring apparatus of claim 11, wherein the reflective component is disposed on an external surface of the vessel.

14. The pressure measuring apparatus of claim 11, wherein the reflective component is disposed on an internal surface of the vessel.

15. The pressure measuring apparatus of claim 1, wherein the vessel comprises a generally cylindrical configuration.

16. The pressure measuring apparatus of claim 1, wherein the vessel is configured to have a first outer dimension, a second outer dimension, and an inner dimension such that the first outer dimension is greater than the second outer dimension and wherein a portion of the vessel is configured with the first outer dimension and another portion is configured with the second outer dimension and wherein the inner dimension remains constant.

17. The pressure measuring apparatus of claim 16, wherein the vessel comprises a second inner dimension configured to be larger than the inner dimension and wherein the portion of the vessel configured with the first outer dimension correlates with the second inner dimension.

18. The pressure measuring apparatus of claim 1 further comprising a temperature regulation device in thermal communication with the first container and configured to regulate the temperature of the first and second fluids and the first and second compressible gases.

19. The pressure measuring apparatus of claim 18, wherein the temperature regulation device comprises an ice water slurry.

20. The pressure measuring apparatus of claim 1, wherein the first fluid is selected from a group of non-polar liquids selected from the group of mineral oil, decamethyltetrasiloxane, and vacuum pump oil.

21. The pressure measuring apparatus of claim 1, wherein the second fluid is selected from a group of polar liquids selected from the group of ethylene glycol, propylene glycol, and water.

22. The pressure measuring apparatus of claim 1, wherein the measuring device is configured to measure changes in position of the vessel to 1 nm of displacement uncertainty.

23. The pressure measuring apparatus of claim 1 wherein the container has an auxiliary arm defining a second internal volume wherein the second internal volume is connected to the internal volume of the container such that the first fluid may flow between the container and the auxiliary arm.

24. A method for measuring pressure comprising:
providing a container having one or more sealable ends defining an internal volume;
disposing at least a first and a second fluid within the internal volume, wherein the first fluid has a density less than the density of the second fluid, such that a first portion of the cavity is filled with the first and second fluids, such that the first and second fluids are separated by a boundary interface, and wherein a second portion of the cavity is filled with a first compressible gas disposed above the first fluid;
placing a vessel having at least one non-sealable opening and at least one sealable portion defining an internal cavity within the first container in a configuration such that the at least one non-sealable opening is disposed in a downward direction;
filling a portion of the vessel with a second compressible gas such that the vessel is buoyantly positioned between the first and second fluids such that the boundary line intersects the vessel at a first pressure;
inducing a change in pressure on the first compressible gas such that the pressure exerted on the first fluid is changed and said pressure change is translated to the second compressible gas through the second fluid thereby changing the volume of space within the portion of the vessel occupied by the second compressible gas, such that the vessel changes position within the first and second fluids relative to the boundary interface;
measuring the movement of the vessel within the first and second fluids disposed within the internal volume; and
translating the measured movement from the measuring device to a pressure change.

* * * * *